(12) United States Patent
Sethumadhavan et al.

(10) Patent No.: US 10,025,929 B2
(45) Date of Patent: Jul. 17, 2018

(54) DETECTION OF ANOMALOUS PROGRAM EXECUTION USING HARDWARE-BASED MICRO-ARCHITECTURAL DATA

(71) Applicants: THE TRUSTEES OF COLUMBIA UNIVERSITY IN THE CITY OF NEW YORK, New York, NY (US); Lakshminarasimhan Sethumadhavan, New York, NY (US); John Demme, New York, NY (US); Jared Schmitz, New York, NY (US); Adrian Tang, New York, NY (US); Sal Stolfo, New York, NY (US); Matthew Maycock, New York, NY (US)

(72) Inventors: Lakshminarasimhan Sethumadhavan, New York, NY (US); John Demme, New York, NY (US); Jared Schmitz, New York, NY (US); Adrian Tang, New York, NY (US); Sal Stolfo, New York, NY (US); Matthew Maycock, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/778,007

(22) PCT Filed: Nov. 5, 2013

(86) PCT No.: PCT/US2013/068451
§ 371 (c)(1),
(2) Date: Sep. 17, 2015

(87) PCT Pub. No.: WO2014/149080
PCT Pub. Date: Sep. 25, 2014

(65) Prior Publication Data
US 2016/0275288 A1 Sep. 22, 2016

Related U.S. Application Data

(60) Provisional application No. 61/803,029, filed on Mar. 18, 2013.

(51) Int. Cl.
*H04L 9/00* (2006.01)
*G06F 21/56* (2013.01)
(Continued)

(52) U.S. Cl.
CPC .......... *G06F 21/566* (2013.01); *G06F 21/572* (2013.01); *G06N 99/005* (2013.01);
(Continued)

(58) Field of Classification Search
CPC combination set(s) only.
See application file for complete search history.

(56) References Cited

U.S. PATENT DOCUMENTS 7,590,880 B1 9/2009 Hershman
7,657,941 B1 2/2010 Zaitsev
(Continued)

FOREIGN PATENT DOCUMENTS

EP 2141626 1/2010

OTHER PUBLICATIONS

Notice to File a Response, Korean Application No. 10-2015-7027779, dated May 12, 2017.
(Continued)

*Primary Examiner* — Josnel Jeudy
(74) *Attorney, Agent, or Firm* — Occhiuti & Rohlicek LLP

(57) ABSTRACT

Disclosed are devices, systems, apparatus, methods, products, media and other implementations, including a method
(Continued)

that includes obtaining hardware-based micro-architectural data, including hardware-based micro-architectural counter data, for a hardware device executing one or more processes, and determining based, at least in part, on the hardware-based micro-architectural data whether at least one of the one or more processes executing on the hardware device corresponds to a malicious process. In some embodiments, determining based on the hardware-based micro-architectural data whether the at least one of the one or more processes corresponds to a malicious process may include applying one or more machine-learning procedures to the hardware-based micro-architectural data to determine whether the at least one of the one or more processes corresponds to the malicious process.

21 Claims, 9 Drawing Sheets

(51) Int. Cl.
  *G06F 21/57* (2013.01)
  *G06N 99/00* (2010.01)
  *H04L 9/32* (2006.01)
  *H04L 29/06* (2006.01)
  *G06F 11/34* (2006.01)

(52) U.S. Cl.
  CPC ........ *H04L 9/3239* (2013.01); *H04L 63/0428* (2013.01); *G06F 11/3466* (2013.01); *G06F 2201/88* (2013.01); *G06F 2221/034* (2013.01)

(56) References Cited

U.S. PATENT DOCUMENTS

| | | | |
|---|---|---|---|
| 7,801,837 | B2 | 9/2010 | Chang et al. |
| 8,074,115 | B2 | 12/2011 | Stolfo et al. |
| 8,229,726 | B1 | 7/2012 | Ramsay et al. |
| 9,369,433 | B1* | 6/2016 | Paul .................. H04L 63/0227 |
| 2003/0070087 | A1 | 4/2003 | Grayaznov et al. |
| 2007/0294768 | A1 | 12/2007 | Moskovitch et al. |
| 2008/0184371 | A1 | 7/2008 | Moskovitch et al. |
| 2008/0189530 | A1 | 8/2008 | McIntosh et al. |
| 2009/0300765 | A1 | 12/2009 | Moskovitch et al. |
| 2011/0041179 | A1 | 2/2011 | Stahlberg |
| 2011/0228926 | A1 | 9/2011 | Shumow et al. |
| 2011/0238855 | A1* | 9/2011 | Korsunsky ............. G06F 21/55 709/231 |
| 2011/0247071 | A1 | 10/2011 | Hooks et al. |
| 2012/0254641 | A1 | 10/2012 | Rotem et al. |
| 2012/0266244 | A1* | 10/2012 | Green .................. G06F 21/566 726/24 |
| 2012/0297057 | A1 | 11/2012 | Ghosh et al. |
| 2014/0223553 | A1* | 8/2014 | Gupta .................... G06F 21/52 726/22 |
| 2016/0275289 | A1 | 9/2016 | Sethumadhavan |

OTHER PUBLICATIONS

Office Action, Chinese Application No. 2013800766921, dated May 4, 2017.
Office Action, Chinese Application No. 2014800287531, dated Jun. 1, 2017.
Azab et al., "SICE: A Hardware-Level Strongly Isolated Computing Environment for x86 Multi-core Platforms", Proceedings of the 18th ACM Conference on Computer and Communications Security, Oct. 17-21, 2011, pp. 375-388.
Bailey et al., "Automated Classification and Analysis of Internet Malware", Proceedings of the 10th International conference on Recent Advances in Intrusion Detection , Apr. 26, 2007, University of Michigan.
Catuogno et al., "A Format-Independent Architecture for Run-Time Integrity Checking of Executable Code", Proceedings of the 3rd International Conference on Security in Communication Networks, Mar. 14, 2003.
Christodorescu et al., "Mining Specifications of Malicious Behavior", Proceedings of the 6th Joint Meeting of the European Software Engineering Conference and the ACM SIGSOFT Symposium on the Foundations of Software Engineering, Sep. 3-7, 2007, pp. 5-14.
Hildebrandt, "A computer architecture with hardwarebased malware detection", 2010 International Conference on Availability, Reliability, and Security, Feb. 15-18, 2010, pp. 41-45, Helmut-Schmidt-Univ. Hamburg, Germany.
Hypponen, "Malware goes mobile", Scientific American, Nov. 2006, pp. 70-77.
Jana et al., "Abusing File Processing in Malware Detectors for Fun and Profit", 2012 IEEE Symposium on Security and Privacy, pp. 80-94, The University of Texas at Austin.
Lee et al., "A Data Mining Framework for Building Intrusion Detection Models", Proceedings of the 1999 IEEE Symposium on Security and Privacy, pp. 120-132.
Moir, Security MVP, "Defining Malware: FAQ", Microsoft Technet Library, Oct. 2003 [retrieved on Jan. 17, 2017] Retrieved from the Internet: <URL: http://technet.microsoft.com/en-us/library/dd632948(d=printer).aspx>.
Notice to File a Response, Korean Application No. 10-2015-7027779, dated Oct. 19, 2016.
Notification of Transmittal of the International Search Report and the Written Opinion of the International Searching Authority, or the Declaration, International Search Report, and Written Opinion, PCT/US2013/068451, dated May 2, 2014.
Notification of Transmittal of the International Search Report and the Written Opinion of the International Searching Authority, or the Declaration, International Search Report, and Written Opinion, PCT/US2014/027375, dated Aug. 8, 2014.
Petroni, et al., "Copilot—a Coprocessor-based Kernel Runtime Integrity Monitor", Proceedings of the 13th USENIX Security Symposium, San Diego, CA, Aug. 9-13, 2004, vol. 13.
Tahan et al., "Automatic Malware Detection using Common Segment, Analysis and Meta-Features", Journal of Machine Learning Research 13 (2012). [retrieved on Jul. 9, 2014] Retrieved from the Internet: <URL: http://imlr.org/papers/volume13/tahan12a/tahan12a.pdf>, pp. 949-979.
Bayer et al., "Scalable, behavior-based malware clustering,"in NDSS, 2009.
Caballero et al., "Measuring Pay-per-Install: The commoditization of malware distribution," in Proceedings of the 20th USENIX Security Symposium, Aug. 2011.
Chien, L. OMurchu, and N. Falliere, "W32.Duqu: The Precursor to the Next Stuxnet," in Proceedings of the 5th USENIX Workshop on Large-Scale Exploits and Emergent Threats (LEET), San Jose, CA, USA, Apr. 2012.
Forrest et al., "A sense of self for unix processes," in Proceedings of the 1996 IEEE Symposium on Security and Privacy, ser. SP '96. Washington, DC, USA: IEEE Computer Society, 1996, pp. 120-.
Isci, G. Contreras, and M. Martonosi, "Live, runtime phase monitoring and prediction on real systems with application to dynamic power management," in Proceedings of the 39th Annual IEEE/ACM International Symposium on Microarchitecture, ser. MICRO 39. Washington, DC, USA: IEEE Computer Society, 2006, pp. 359-370.
Laboratory of Cryptography and System Security (CrySyS Lab), "sKy-Wiper: A Complex Malware for Targeted Attacks," http://www.crysys.hu/skywiper/skywiper.pdf, Budapest University of Technology and Economics, Tech. Rep. v1.05, May 2012.
Lanzi et al., "Accessminer: using system-centric models for malware protection," in Proceedings of the 17th ACM conference on Computer and communications security, ser. CCS'10. New York, NY, USA: ACM, 2010, pp. 399-412.
Rieck et al., "Learning and classification of malware behavior," in Proceedings of the 5th international conference on Detection of Intrusions and Malware, and Vulnerability Assessment, ser. DIMVA '08. Berlin, Heidelberg: Springer-Verlag, 2008, pp. 103-125.

(56) References Cited

OTHER PUBLICATIONS

Sethumadhavan, Simha, Salvatore J. Stolfo, Angelos Keromytis, Junfeng Yang, and David August. "The sparchs project: Hardware support for software security." In SysSec Workshop (SysSec), 2011 First, pp. 119-122, IEEE, 2011.
Sherwood et al., "Discovering and exploiting program phases," Micro, IEEE, vol. 23, No. 6, pp. 84-93, Nov.-Dec. 2003.
Sherwood, S. Sair, and B. Calder, "Phase tracking and prediction," in Proceedings of the 30th annual international symposium on Computer architecture, ser. ISCA '03. New York, NY, USA: ACM, 2003, pp. 336-349.
Ször and P. Ferrie, "Hunting for metamorphic," in in Virus Bulletin Conference, 2001, pp. 123-144.
Yuan, W. Xing, H. Chen, and B. Zang, "Security breaches as pmu deviation: detecting and identifying security attacks using performance counters," in APSys, 2011, p. 6.
Zhou and X. Jiang, "Dissecting android malware: Characterization and evolution," in Security and Privacy (SP), 2012 IEEE Symposium on, May 2012, pp. 95-109.
Borello and L Mé, "Code obfuscation techniques for metamorphic viruses," Journal in Computer Virology, vol. 4, No. 3, pp. 211-220, 2008.
Bruschi, L. Cavallaro, and A. Lanzi, "An efficient technique for preventing mimicry and impossible paths execution attacks," in Performance, Computing, and Communications Conference, 2007. IPCCC 2007. IEEE Internationa. IEEE, 2007, pp. 418-425.
chkrootkit, 2008, Aprril [Online]. Available: http://freecode.com/projects/chkrootkit.
Clark, B. Ransford, A. Rahmati, S. Guineau, J. Sorber, K, Fu, and W. Xu, "WattsUpDoc: Power Side Channels to Nonintrusively Discover Untargeted Malware on Embedded Medical Devices," in USENIX Workshop on Health Information Technologies, Aug 2013.
Corelan Team, "Corelan ROPdb," Jul 2011. https://www.corelan.be/index.php/security/corelan-ropdb/.
Demme, M. Maycock, J. Schmitz, A. Tang, A. Waksman, S. Sethumadhavan, and S. Stolfo, "On the feasibility of online malware detection with performance counters," in Proceedings of the 40th Annual International Symposium on Computer Architecture, ser. ISCA '13. New York, NY, USA: ACM, 2013, pp. 559-570.
Duda, P. E. Hart, and D. G. Stork, "Pattern Classification, New York: John Wiley & Sons, 2001, pp. xx + 654, isbn: 0-471-05669-3," J. Classif., vol. 24, No. 2, pp. 305-307, Sep. 2007.
Fewer, S., "Reflective DLL injection," Oct. 2008.
Gonzalez and J. H. Reed, "Detecting unauthorized software execution in sdr using power fingerprinting," in Military Communications Conference, 2010-MILCOM 2010. IEEE, 2010, pp. 2211-2216.
Henning, "Spec cpu2006 benchmark descriptions," SIGARCH Comput. Archit. News, vol. 34, No. 4, pp. 1-17, Sep. 2006.
Hoffmann, S. Neumann, and T. Holz, "Mobile malware detection based on energy fingerprints—a dead end?" in Research in Attacks, Intrusions, and Defenses. Springer, 2013, pp. 348-368.
Hofmeyr, S. Forrest, and A. Somayaji, "Intrusion detection using sequences of system calls," Journal of computer security, vol. 6, No. 3, pp. 151-180, 1998.
Hoste and L. Eeckhout, "Comparing Benchmarks Using Key Microarchitecture-independent Characteristics," in Workload Characterization, 2006 IEEE International Symposium on IEEE, Oct. 2006, pp. 83-92.
Kayaalp, T. Schmitt, J. Nomani, D. Ponomarev, and N. B. Abu-Ghazaleh, "Scrap: Architecture for signature-based protection from code reuse attacks," in HPCA, 2013, pp. 258-269.
Kim, J. Smith, and K. G. Shin, "Detecting energy-greedy anomalies and mobile malware variants," in Proceedings of the 6th international conference on Mobile systems, applications, and services. ACM, 2008, pp. 239-252.
Kong, D. Tian, P. Liu, and D. Wu, "Sa3: Automatic semantic aware attribution analysis of remote exploits," in Security and Privacy in Communication Networks. Springer, 2012, pp. 190-208.

Krügel, T. Toth, and E. Kirda, "Service specific anomaly detection for network intrusion detection," in Proceedings of the 2002 ACM symposium on Applied computing. ACM, 2002, pp. 201-208.
Mahoney, "Network traffic anomaly detection based on packet bytes," in Proceedings of the 2003 ACM symposium on Applied computing. ACM, 2003, pp. 346-350.
Malone, M. Zahran, and R. Karri, "Are hardware performance counters a cost effective way for integrity checking of programs," in Proceedings of the sixth ACM workshop on Scalable trusted computing, ser. STC '11. New York, NY, USA: ACM, 2011, pp. 71-76.
Marceau, "Characterizing the behavior of a program using multiplelength n-grams," in Proceedings of the 2000 workshop on New security paradigms. ACM, 2001, pp. 101-110.
Matias, Linux rootkit implementation. Dec., 2011 [online] Available: http://average-coder.blogspot.com/2011/12/linux-rootkit.html.
Osvik, A. Shamir, and E. Tromer, "Cache attacks and countermeasures: the case of aes," in Proceedings of the 2006 The Cryptographers' Track at the RSA conference on Topics in Cryptology, ser. CT-RSA'06. Berlin, Heidelberg: Springer-Verlag, 2006, pp. 1-20.
Pappas, M. Polychronakis, and A. D. Keromytis, "Transparent rop exploit mitigation using indirect branch tracing," in Proceedings of the 22nd USENIX conference on Security, ser, SEC'13. Berkeley, CA, USA: USENIX Association, 2013, pp. 447-462.
Peisert, M. Bishop, S. Karin, and K. Marzullo, "Analysis of computer intrusions using sequences of function calls," Dependable and Secure Computing, IEEE Transactions on, vol. 4, No. 2, pp. 137-150, 2007.
Polychronakis, K. G. Anagnostakis, and E. P. Markatos, "Comprehensive shellcode detection using runtime heuristics," in Proceedings of the 26th Annual Computer Security Applications Conference. ACM, 2010, pp. 287-296.
Polychronakis, K. G. Anagnostakis, and E. P. Markatos, "Emulationbased detection of non-self-contained polymorphic shellcode," in Recent Advances in Intrusion Detection. Springer, 2007, pp. 87-106.
The rootkit hunter project. May, 2012 [Online]. Available: http://rkhunter.sourceforge.net/.
Schölkopf, J. C. Platt, J. C. Shawe-Taylor, A. J. Smola, and R. C. Williamson, "Estimating the support of a high-dimensional distribution," Neural Comput., vol. 13, No. 7, pp. 1443-1471, Jul. 2001.
Szor, The art of computer virus research and defense. Pearson Education, 2005.
Sekar, M. Bendre, D. Dhurjati, and P. Bollineni, "A fast automatonbased method for detecting anomalous program behaviors," in Security and Privacy, 2001, S&P 2001. Proceedings. 2001 IEEE Symposium on. IEEE, 2001, pp. 144-155.
Shen, M. Zhong, S. Dwarkadas, C. Li, C. Stewart, and X. Zhang, "Hardware counter driven on-the-fly request signatures," in Proceedings of the 13th international conference on Architectural support for programming languages and operating systems, ser. ASPLOS XIII. New York, NY, USA: ACM, 2008, pp. 189-200.
Somayaji and S. Forrest, "Automated response using system-call delays," in Proceedings of the 9th USENIX Security Symposium, vol. 70, 2000.
Stewin, "A primitive for revealing stealthy peripheral-based attacks on the computing platform's main memory," in Research in Attacks, Intrusions, and Defenses. Springer, 2013, pp. 1-20.
Stone-Gross et al., "The underground economy of fake antivirus software," in Economics of Information Security and Privacy III, B. Schneier, Ed. Springer New York, 2013, pp, 55-73.
TrendMicro, "The crimeware evolution," http://www.trendmicro.com/cloud-content/us/pdfs/security-intelligence/white-papers/wp-the-crimeware-evolution.pdf, 2012.
Trend Micro Corporation, "Russian underground 2.0." Feb. 20, 2018.
Wang, J. J. Parekh, and S. J. Stoifo, "Anagram: A content anomaly detector resistant to mimicry attack," in Recent Advances in Intrusion Detection. Springer, 2006, pp, 226-248.
Wang and R. Karri, "Numchecker: detecting kernel control-flow modifying rootkits by using hardware performance counters," in Proceedings of the 50th Annual Design Automation Conference, ser. DAC '13. New York, NY, USA: ACM, 2013, pp. 79:1-79:7.

(56) References Cited

OTHER PUBLICATIONS

Xia, Y. Liu, H. Chen, and B. Zang, "CFIMon: Detecting violation of control flow integrity using performance counters," in Proceedings of the 2012 42nd Annual IEEE/IFIP International Conference on Dependable Systems and Networks (DSN), ser. DSN '12. Washington, DC, USA: IEEE Computer Society, 2012, pp. 1-12.
Zhang Guang-hui, Shen Jian-mai, Nie Zhen-long, Wang Jin-zhe, Yan Ming-jiang, Hao Ming-liang, "Theory and methodology of regional groundwater function and sustainable utilization assessment in China" Institute of Hydrogeology and Environmental Geology, CAGS, Shijiazhuang 050061 China, Apr. 2006: pp. 161-185 [English Abstract Included].

\* cited by examiner

| Malware Family | APKs | Training Threads | Testing Threads | Correctly Identified | Rate |
|---|---|---|---|---|---|
| Tapsnake | 1 | 31 | 3 | 3 | 100% |
| Zitmo | 1 | 5 | 1 | 1 | 100% |
| Loozfon-android | 1 | 25 | 7 | 7 | 100% |
| Android.Steek | 3 | 9 | 9 | 9 | 100% |
| Android.Trojan.Qicsomos | 1 | 12 | 12 | 12 | 100% |
| CruseWin | 1 | 2 | 4 | 4 | 100% |
| Jifake | 1 | 7 | 5 | 5 | 100% |
| AnserverBot | 187 | 9716 | 11904 | 11505 | 96.6% |
| Gone60 | 9 | 33 | 67 | 59 | 88.1% |
| YZHC | 1 | 9 | 8 | 7 | 87.5% |
| FakePlayer | 6 | 7 | 15 | 13 | 86.7% |
| LoveTrap | 1 | 5 | 7 | 6 | 85.7% |
| Bgserv | 9 | 119 | 177 | 151 | 85.3% |
| KMIN | 40 | 43 | 30 | 25 | 83.3% |
| DroidDreamLight | 46 | 181 | 101 | 83 | 82.2% |
| HippoSMS | 4 | 127 | 28 | 23 | 82.1% |
| Dropdialerab | 1 | 18* | 16* | 13 | 81.3% |
| Zsone | 12 | 44 | 78 | 63 | 80.8% |
| Endofday | 1 | 11 | 10 | 8 | 80.0% |
| AngryBirds-LeNa.C | 1 | 40* | 24* | 19 | 79.2% |
| jSMSHider | 16 | 101 | 89 | 70 | 78.7% |
| Plankton | 25 | 231 | 551 | 432 | 78.4% |
| PJAPPS | 16 | 124 | 174 | 136 | 78.2% |
| Android.Sumzand | 1 | 8 | 9 | 7 | 77.8% |
| RogueSPPush | 9 | 236 | 237 | 184 | 77.6% |
| FakeNetflix | 1 | 27 | 8 | 6 | 75.0% |
| GEINIMI | 28 | 189 | 203 | 154 | 75.9% |
| SndApps | 10 | 110 | 77 | 56 | 72.7% |
| GoldDream | 47 | 1160 | 237 | 169 | 71.3% |
| CoinPirate | 1 | 8 | 10 | 7 | 70.0% |
| BASEBRIDGE | 1 | 14* | 72 | 46 | 63.8% |
| DougaLeaker.A | 6 | 12* | 35* | 22 | 62.9% |
| NewZitmo | 1 | 5 | 8 | 5 | 62.5% |
| BeanBot | 8 | 122 | 93 | 56 | 60.2% |
| GGTracker | 1 | 16 | 15 | 9 | 60.0% |
| FakeAngry | 1 | 7 | 10 | 5 | 50.0% |
| DogWars | 1 | 14 | 8 | 2 | 25.0% |

FIG. 5

DETECTION OF ANOMALOUS PROGRAM EXECUTION USING HARDWARE-BASED MICRO-ARCHITECTURAL DATA

CROSS-REFERENCE TO RELATED APPLICATIONS

This application claims the benefit of, and priority to, International Application No. PCT/US2013/068451, entitled "DETECTION OF ANOMALOUS PROGRAM EXECUTION USING HARDWARE-BASED MICRO-ARCHITECTURAL DATA," and filed Nov. 5, 2013, which claims the benefit of, and priority to, provisional U.S. application Ser. No. 61/803,029 entitled "SYSTEMS AND METHODS TO DETECT ANOMALOUS PROGRAM EXECUTION USING PROCESSOR MICROARCHITECTURAL EVENTS," and filed Mar. 18, 2013, the contents of all of which are incorporated herein by reference in their entireties.

STATEMENT REGARDING FEDERALLY SPONSORED RESEARCH

This invention was made with government support under grant FA 8750-10-2-0253 awarded by the Air Force Research Laboratory, Information Directorate. The Government has certain rights in the invention.

BACKGROUND

The proliferation of computers in a particular domain is generally followed by the proliferation of malicious processes (e.g., malware) in that domain. For example, systems that include the latest Android devices are laden with viruses, rootkits spyware, adware and other classes of malicious processes. Despite the existence of anti-virus software, malware threats (as well as threats from other types of malicious processes) persist and are growing. Unfortunately, there exist myriad ways to subvert commercial anti-virus software, including simply disabling the anti-virus. Furthermore, malware can mutate into new variants, which makes static detection of malware difficult.

Examples of some common malware processes are provided below:

| Malware | Brief Description |
| --- | --- |
| Worm | Malware that propagates itself from one infected host to other hosts via exploits available on the surface (system call interfaces) of the operating system. |
| Virus | Malware that attaches itself to running programs and spreads itself through users' interactions with various systems. |
| Polymorphic Virus | A virus that, when replicating to attach to a new target, alters its payload to evade detection, i.e., takes on a different shape but performs the same function. |
| Metamorphic Virus | A virus that, when replicating to attach to a new target, alters both the payload and functionality, including the framework for generating future changes. |
| Trojan | Malware that masquerades as non-malware and acts maliciously once installed (opening backdoors, interfering with system behavior, etc.) |
| AdWare | Malware that forces the user to deal with unwanted advertisements. |
| SpyWare | Malware that secretly observes and reports on users computer usage and personal information accessible therein. |
| Botnet | Malware that employs a user's computer as a member of a network of infected computers controlled by a central malicious agency. |
| Rootkit | A malware package that exploits security holes in the operating system to gain superuser access. Usually, a rootkit attempts to hide its existence while performing malicious superuser activities by tampering with the file system. |

Malicious processes, such as malware, were originally created to attain notoriety or for fun, but today malware deployment is mostly motivated by economic gains. There are reports of active underground markets for personal information, credit cards, logins into sensitive machines in the United States, etc. Also, malicious processes such as malware have been developed to target specific computers for industrial espionage purposes and/or for sabotage.

SUMMARY

The devices, systems, apparatus, methods, products, media and other implementations disclosed herein include a method including obtaining hardware-based micro-architectural data, including hardware-based micro-architectural counter data, for a hardware device executing one or more processes, and determining based, at least in part, on the hardware-based micro-architectural data whether at least one of the one or more processes executing on the hardware device corresponds to a malicious process.

Embodiments of the method may include at least some of the features described in the present disclosure, including one or more of the following features.

Obtaining the hardware-based micro-architectural data may include obtaining the hardware-based micro-architectural data at various time instances.

Obtaining the hardware-based micro-architectural data at the various time instances may include performing one or more of, for example, a data push operation initiated by the hardware device to send the micro-architectural data, and/or a data pull operation, initiated by an antivirus engine, to send the micro-architectural data.

Obtaining the hardware-based micro-architectural data may include obtaining multi-core hardware-based micro-architectural data resulting from execution of the one or more processes on a processor device with multiple processor cores, and correlating the respective hardware-based micro-architectural data obtained from each of the multiple processor cores to the one or more processes.

Determining based on the hardware-based micro-architectural data whether the at least one of the one or more processes corresponds to a malicious process may include applying one or more machine-learning procedures to the hardware-based micro-architectural data to determine whether the at least one of the one or more processes corresponds to the malicious process.

Applying the one or more machine-learning procedures to the hardware-based micro-architectural data to determine whether the at least one of the one or more processes corresponds to the malicious process may include matching the obtained hardware-based micro-architectural data to previously identified patterns of hardware-based micro-architectural data associated with one or more malicious processes.

The method may further include obtaining updates for the previously identified patterns of hardware-based micro-architectural data associated with the one or more malicious processes.

Obtaining the updates may include downloading encrypted data for the previously identified patterns of hardware-based micro-architectural data associated with the one or more malicious processes to an antivirus engine in communication with the hardware device providing the hardware-based micro-architectural data, decrypting at the antivirus engine the downloaded encrypted data for the previously identified patterns of hardware-based micro-architectural data associated with the one or more malicious processes, and updating a revision counter maintained by the antivirus engine indicating a revision number of a most recent update of the previously identified patterns of hardware-based micro-architectural data.

The one or more machine learning procedures may include one or more of, for example, a k-nearest neighbor procedure, a decision tree procedure, a random forest procedure, an artificial neural network procedure, a tensor density procedure, and/or a hidden Markov model procedure.

The malicious process may include one or more of, for example, a malware process, and/or a side-channel attack process.

The hardware-based micro-architectural data may include one or more of, for example, processor load density data, branch prediction performance data, and/or data regarding instruction cache misses.

In some variations, a system is provided that includes a hardware device executing one or more processes, and an antivirus engine in communication with the hardware device. The antivirus engine is configured obtain hardware-based micro-architectural data, including hardware-based micro-architectural counter data, for the hardware device executing the one or more processes, and determine based, at least in part, on the hardware-based micro-architectural data whether at least one of the one or more processes executing on the hardware device corresponds to a malicious process.

Embodiments of the system may include at least some of the features described in the present disclosure, including at least some of the features described above in relation to the method, as well as one or more of the following features.

The antivirus engine configured to obtain the hardware-based micro-architectural data may be configured to obtain the hardware-based micro-architectural data at various time instances.

The antivirus engine configured to obtain the hardware-based micro-architectural data at the various time instances may be configured to receive the micro-architectural data in response to one or more of, for example, a data push operation initiated by the hardware device, and/or a data pull operation initiated by the antivirus engine.

The antivirus engine configured to determine based on the hardware-based micro-architectural data whether the at least one of the one or more processes corresponds to a malicious process may be configured to apply one or more machine-learning procedures to the hardware-based micro-architectural data to determine whether the at least one of the one or more processes corresponds to the malicious process.

The antivirus engine configured to apply the one or more machine-learning procedures to the hardware-based micro-architectural data to determine whether the at least one of the one or more processes corresponds to the malicious process may be configured to match the obtained hardware-based micro-architectural data to previously identified patterns of hardware-based micro-architectural data associated with one or more malicious processes.

The antivirus engine may further be configured to obtain updates for the previously identified patterns of hardware-based micro-architectural data associated with the one or more malicious processes.

In some variations, a computer readable media storing a set of instructions executable on at least one programmable device is provided. The set of instructions, when executed, causes operations including obtaining hardware-based micro-architectural data, including hardware-based micro-architectural counter data, for a hardware device executing one or more processes, and determining based, at least in part, on the hardware-based micro-architectural data whether at least one of the one or more processes executing on the hardware device corresponds to a malicious process.

Embodiments of the computer readable media may include at least some of the features described in the present disclosure, including at least some of the features described above in relation to the method and the system.

In some variations, an apparatus is provided. The apparatus includes means for obtaining hardware-based micro-architectural data, including hardware-based micro-architectural counter data, for a hardware device executing one or more processes, and means for determining based, at least in part, on the hardware-based micro-architectural data whether at least one of the one or more processes executing on the hardware device corresponds to a malicious process.

Embodiments of the apparatus may include at least some of the features described in the present disclosure, including at least some of the features described above in relation to the method, the system, and the computer readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

FIG. 5 is a table of Android malware families, and detection results therefor, tested using, for example, the systems and procedures of FIGS. 2-4.

Like reference symbols in the various drawings indicate like elements.

DESCRIPTION

Figure 1:
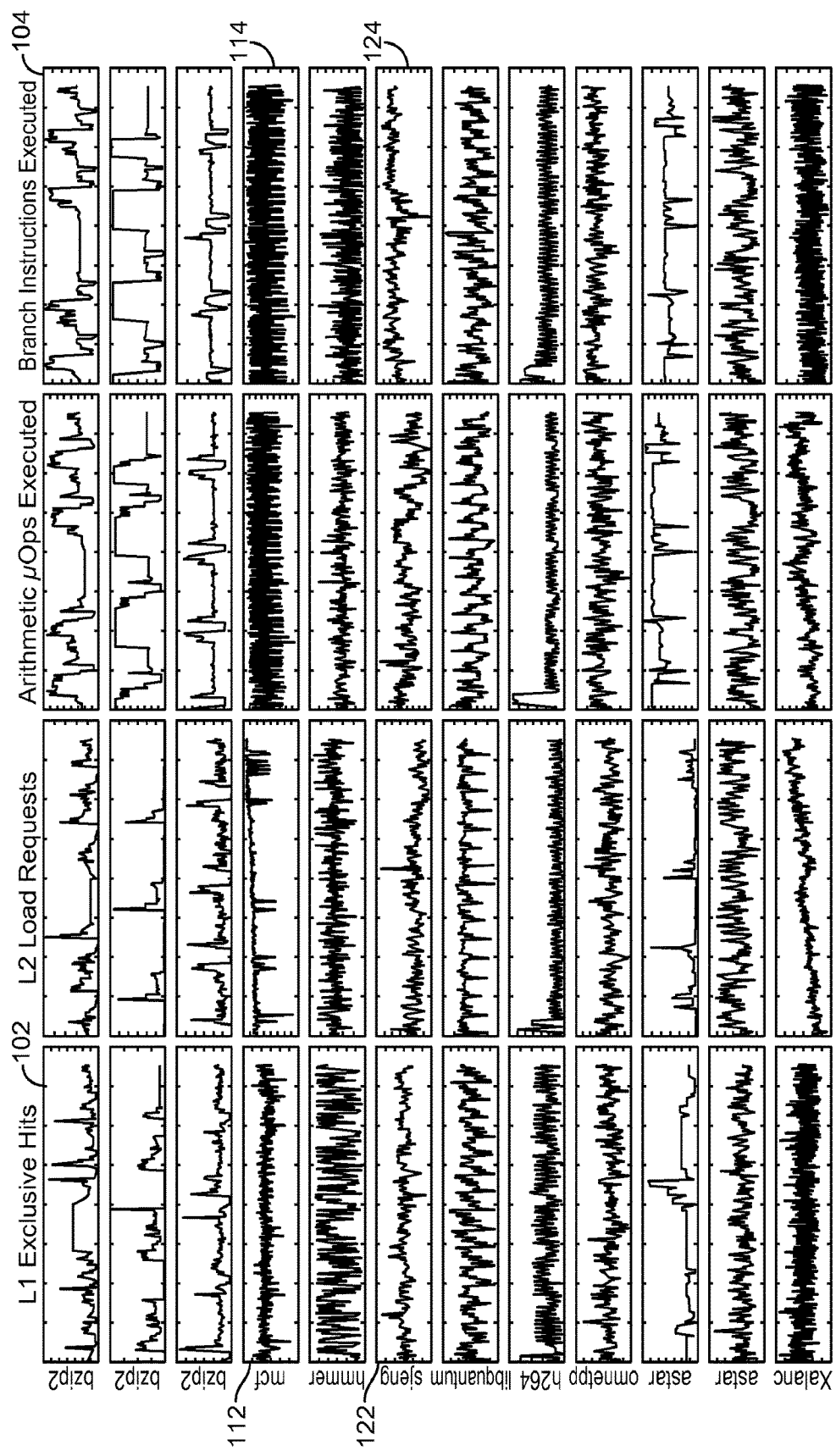
FIG. 1 includes example illustrations of graphs of hardware micro-architectural activity for several different processes.

Described herein are systems, devices, apparatus, computer program products, and other implementations for detection of anomalous program execution processes, such as malware. In some implementations, hardware-based micro-architectural data, including hardware-based micro-architectural counter data (e.g., from hardware-based performance counters) is obtained from a hardware device (such as a processor/computing-based device), and analyzed (e.g., to analyze the temporal behavior of executing processes that resulted in the micro-architectural data) using machine-learning procedures (e.g., classification procedures), to identify malicious processes from one or more processes executing on the hardware device being monitored Generally, processes executing on a hardware-implemented controller device (be it a general-purpose processor, an application-specific controller, etc.) exhibit phase behavior. A process (be it a malicious or non-malicious process) that is configured to achieve a particular functionality may perform activity A for a while, then switch to activity B, then to activity C. Although such a process may alternate in the exact order of performance of the activities, typically the process would need to perform activities A, B, and C to accomplish its particular functionality. The activity phases that correspond to a particular process typically correspond to patterns in architectural and micro-architectural events. Additionally, different processes (e.g., different programs configured to perform different functionalities) result in different hardware-based micro-architectural behavior. For example, FIG. 1, providing example illustrations of micro-architectural activity graphs for several different processes, show that the micro-architectural behavior for different processes (in the example of FIG. 1, the processes were from the SPEC benchmark suite) tend to be different, resulting in different hardware micro-architectural traces or patterns. For example, as shown in FIG. 1, the behavior for the L1 exclusive hits and the executed branch instructions monitored for the 'bzip2' process (as illustrated in graphs 102 and 104) is different from the behavior for the L1 exclusive hits and the executed branch instructions for the 'mcf' process (illustrated in graphs 112 and 114), which in turn is different from the behavior for the L1 exclusive hits and the executed branch instructions for the 'sjeng' process (illustrated in graphs 122 and 124). It is to be noted that monitoring the micro-architectural behavior may be facilitated by specific built-in counters, and/or may be achieved by measuring/monitoring occurrences of event at specific points on the circuits of the hardware device being monitored.

Accordingly, processes executing on a hardware device (e.g., hardware-based controller device) may be distinguished (and thus identified) based on such time-varying micro-architectural signatures/traces. Generally, minor variations in the exact implementation of a particular process do not significantly affect the generated hardware-based micro-architectural traces resulting from the process, and, therefore, identifying the process and/or a determining whether the process is malicious or not (e.g., via machine learning classification procedures, heuristic and non-heuristic procedures analyzing the micro-architectural data, etc.) can still be performed. This is because regardless of how a malicious process (e.g., malware) writers change the underlying implementation (e.g., the software program), the semantics of the process do not change significantly. For instance, if a piece of malware is designed to collect and log GPS data, then no matter how its writer re-arranges the code, the process will still have to collect and log GPS data. In other words, the activity phases characterizing the process will generally remain regardless of the specific implementation of the process. Additionally, a particular task that needs to be accomplished will include various sub-tasks that cannot be significantly modified. For example, a GPS logger will always have to warm up the GPS, wait for signals, decode the data, log it, and, at some future point, exfiltrate the data back to the rogue user (privacy thief) seeking to obtain the data. As a result of these generally invariant operations required to accomplish particular tasks or processes, particular phases of the malicious process' execution remain relatively invariant for different implementation variations.

Thus, hardware-based micro-architectural data (e.g., data from hardware performance counters) such as processor load density data, branch prediction performance data, data regarding instruction cache misses, etc., can be used to identify malware and/or other types of malicious processes. Experimental results (more particularly discusses below) show that the detection techniques/procedures described herein tend to be robust to variations in malware programs (or other types of malicious processes). Thus, after examining a small set of variations within a family of malware on a processing platform (e.g., Android ARM and Intel Linux platforms), many variations within that family may be substantially accurately detected. Further, various implementations described herein enable malicious process detectors, such as the detectors described herein, to run securely beneath the system software, thus reducing, or all together avoiding, the danger of being turned off.

Accordingly, in some embodiments, methods, systems, devices, products, and other implementations are disclosed that include a method including obtaining hardware-based micro-architectural data, including, for example, hardware-based micro-architectural counter data, for a hardware device executing one or more processes, and determining based, at least in part, on the hardware-based micro-architectural data whether at least one of the one or more processes executing on the processor-based system corresponds to a malicious process. The malicious process being identified/detected may include one or more of, for example, a malware process, and/or a side-channel attack process.

Figure 2:
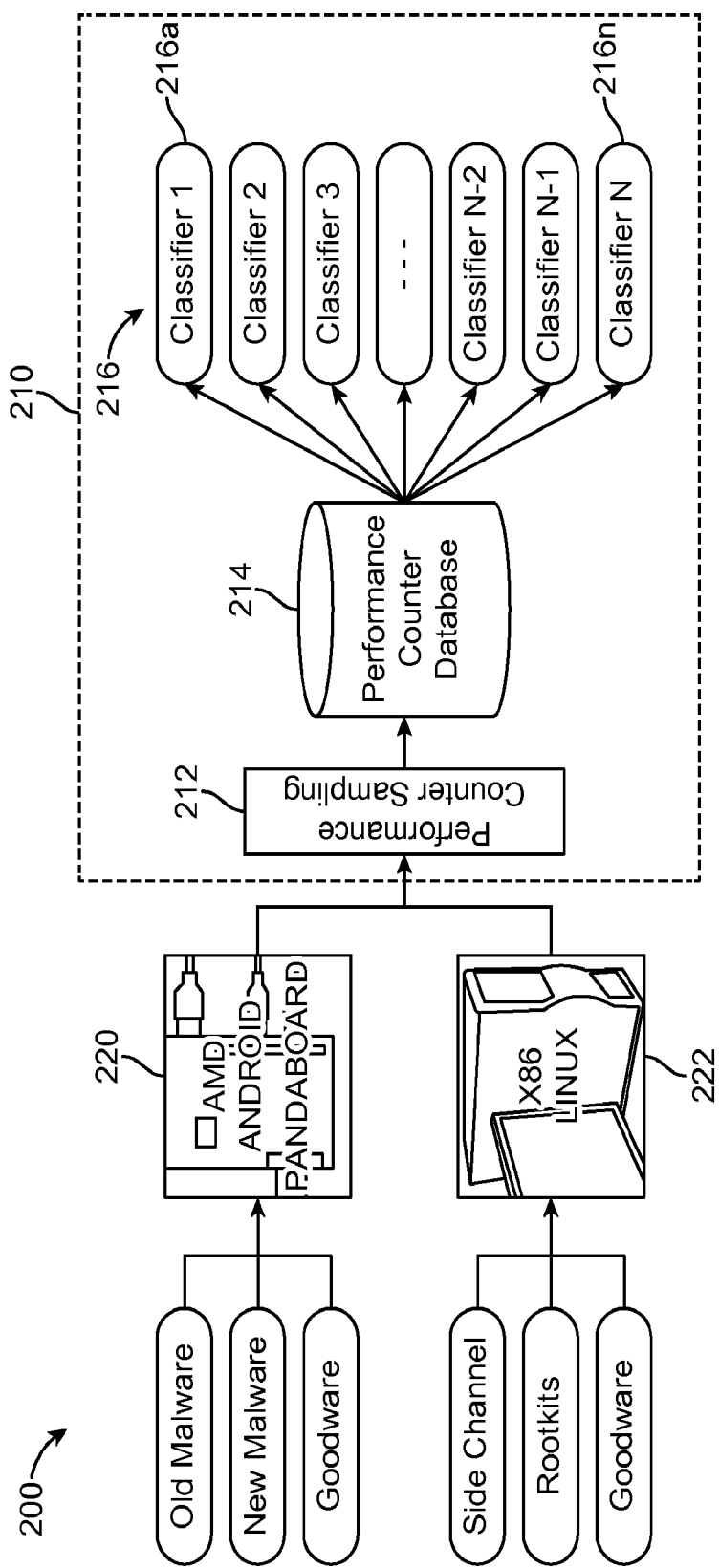
FIG. 2 is a schematic diagram of an example system to detect malicious processes

With reference to FIG. 2, a schematic diagram of an example system 200 to detect and/or resolve malicious processes is shown. The system 200 includes an antivirus (AV) engine 210 that comprises, in some embodiments, a performance counter sampling unit (also referred to as a "sampler") 212, a performance counter database 214 that stores/maintains representative micro-architectural profiles or signatures (including performance counter profiles or signatures) corresponding to various processes (including malware processes), and micro-architectural data collected by the sampling unit 212, and a classifier 216 configured to analyze the collected hardware micro-architectural data to determine if the one or more processes running on the hardware device being observed/monitored includes at least one malicious process (in some embodiments, the classifier 216 may also be configured to more particularly identify such a malicious process). The AV engine 210 is generally in communication with one or more hardware devices such as processor devices 220 and/or 222 shown in FIG. 2.

The sampling unit 212 is configured to obtain hardware-based micro-architectural data, including, for example, hardware-based micro-architectural performance counter data from the one or more hardware-devices, which may include devices such as controller devices, e.g., processor devices such as the devices 220 and 222, or any other type of controller devices including controller devices implemented using modules such as an FPGA (field programmable gate array), an ASIC (application-specific integrated circuit), a DSP processor, etc. Generally, hardware-based controller devices include hardware-related performance counters that may be configured to count a variety of events such as cycles, instructions, cache misses, etc. In some implementations, these performance counters are used to assist in software performance optimization. For example, the Intel For x86 processor device implements four (4) configurable performance counters, and the OMAP4460 processor with dual ARM Cortex-A9 cores includes six (6) configurable performance counters. The AV engine 210 is implemented to obtain micro-architectural data (e.g., performance counter data) from known controller designs, and as such the AV engine 210 may be configured to obtain micro-architectural data from specific known performance counters particular to the hardware that is being monitored by the AV engine. That is, knowledge of the specific architecture of the hardware to be monitored may be required in order to obtain performance counter data and other micro-architectural data from the performance counters corresponding to the specific architecture. Examples of micro-architectural counters used on an Intel x86 processor architecture include:

0x0440—L1D_CACHE_LD.E_STATE;
    0x0324—L2_RQSTS.LOADS;
    0x03b1—UOPS_EXECUTED.PORT (1 or 2); and
    0x7f88—BR_INST_EXEC.ANY.

Examples of common counters (feature event number assignments) on the ARM Cortex-A9 cores architecture, through which micro-architectural data can be obtained, include event numbers:

0x06—Memory-reading instruction architecturally executed (counter increments for every instruction that explicitly read data);
    0x07—Memory-writing instruction architecturally executed (counter increments for every instruction that explicitly wrote data);
    0x0C—Software change of PC, except by an exception, architecturally executed (counter does not increment for a conditional instruction that fails its condition code);
    0x0D—Immediate branch architecturally executed (counter counts for all immediate branch instructions that are architecturally executed);
    0x0F—Unaligned access architecturally executed (counter counts each instruction that is an access to an unaligned address); and
    0x12—Counter counts branch or other change in program flow that could have been predicted by the branch prediction resources of the processor.

Additional information on micro-architectural counters that may be implemented on the ARM Cortex-A9 cores architecture is provided, for example, at "ARM® Architecture Reference Manual, Arm®v7-A and ARM®v7-R edition, Errata markup," the content of which is incorporated herein by reference in its entirety.

In some embodiments, the sampling unit 212 may be configured to obtain hardware micro-architectural data (including micro-architectural performance counter data) from the counters of the hardware monitored through data push procedures and/or through data pull procedures. For example, when pulling data, the AV engine 210 initiates the data collection, causing hardware targets (e.g., specific hardware performance counters implemented in the hardware being monitored) to be accessed by, for example, interrupting execution of the counters and/or querying the counters without interruptions. In some embodiments, the AV engine 210 may be configured, e.g., via the sampling module 212, to interrupts the hardware once every N cycles (where N may be a constant pre-determined number, or may be a varying number, e.g., based on a random or pseudo-random generator), and sample the various performance/event counters, as well as other values (e.g., the currently executing process' PID). When performing sampling operations using an interrupt-based procedure, the sampling unit 212 may be configured to send control signals or otherwise cause the executing hardware to be interrupted, access the performance counters and/or other storage hardware, and retrieve the values stored on the counters of the interrupted hardware for further processing by the AV engine 210. In some embodiments, upon interruption of the hardware and/or the counters, the interrupted hardware may first store data held by its various performance counters in a central storage location (e.g., in a state stack), and the data stored at the central storage location may then be accessed and retrieved by the sampling unit 212. When implementing a data-push sampling mode, data held by the performance counters (and/or other sampling points on the hardware being monitored) may be configured to be communicated to the AV engine 210 (e.g., to the sampling unit 212) at regular or irregular intervals, with or without interrupting the execution of the hardware being monitored or of its performance counters. Thus, in such embodiments, the hardware device to be monitored is configured to initiate sending the microarchitectural data to the AV engine 210. For example, in a data push mode, the hardware device being monitored may be configured to send micro-architectural data without needing to receive a request (e.g., from the sampling unit 212).

The sampling operations implemented by the sampling unit 212 of the AV engine 210 thus obtain time-based data of the output of the various hardware performance counters (and/or other output points) monitored for one or more processes executing on the hardware being monitored. As noted, in addition to micro-architectural data, information such as a process' ID (e.g., PID) is also recorded to enable associating/correlating the micro-architectural data with the process whose execution resulted in the obtained micro-architectural data. By also recording processes' IDs and associating/correlating them with the obtained micro-architectural data, the implementations described herein can track micro-architectural data resulting from execution of a process across different hardware devices. For example, in situations where a system being monitored includes multiple processor cores (each with its own set of performance counters), where processes/threads may be suspend and resume execution on different cores, maintaining processes' PID's along with obtained micro-architectural data may enable tracking the behavior of processes as they switch execution to different hardware devices.

In some embodiments, the sampling unit 212 may be realized, at least in part, on the hardware device being monitored. For example, the sampling unit 212 may be implemented as a hardware realization on a specialized hardware-based controller such as an FPGA, an ASIC, etc.) In some embodiments, the micro-architectural database 212 may be realized, at least in part, as a software implementation executing on a machine that includes a processor-based device that is being monitored by the AV engine 210 to detect malicious processes that are executing on the machine. For example, one of a processor-device's multiple general-purpose cores may be allocated to execute a software realization of at least part of the AV engine.

As noted the AV engine 210 also includes a micro-architectural database 214 configured to store the micro-architectural data obtained from the hardware being monitored/observed, as well as pre-determined data sets, obtained from remote nodes (e.g., servers), that include data representative of micro-architectural signatures/traces of known malicious processes (e.g., time-series traces for various micro-architectural events or performance counters) and training data that includes micro-architectural data (e.g., time-based data) for non-malicious/benign processes. As will be described below in greater details, in some embodiments, the AV engine 210 is periodically (at regular or irregular intervals) updated to include new or modified micro-architectural signature data defining the behavior of new or existing malicious processes by receiving from a remote node micro-architectural signature data.

In some embodiments, the database 214 may be realized, at least in part on the hardware device being monitored. In some embodiments, the micro-architectural database 214 may be realized, at least in part, as a software implementation executing on a machine that includes a processor-based device being monitored by the AV engine 210 (e.g., allocating one of a processor-device's multiple general-purpose cores to execute a software realization of the database 214).

Collection of micro-architectural data (including micro-architectural performance counter data) using, for example, the sampling unit 212, and/or storage of the collected data using, for example, the database 214, provides a relatively large amount of labeled data that includes micro-architectural data resulting from execution of malicious processes (e.g., malware) and non-malicious processes. Thus, in some embodiments, the classifier 216 (also referred to as a machine-learning engine) is configured to determine whether at least one of the processes with respect to which the micro-architectural data was collected corresponds to a malicious process (e.g., whether some of the micro-architectural data traces collected potentially resulted from execution of the at least one malicious process) and/or identify the at least one malicious process.

In some implementations, a classifier, such as the classifier 216 of the AV engine 210, may be configured to iteratively analyze training input data and the input data's corresponding output (e.g., a determination of a process type and/or identification of a process corresponding to the input data), and derive functions or models that cause subsequent micro-architectural inputs, collected from the hardware being monitored, to produce outputs consistent with the classifier's learned behavior. Such a classifier should be configured to distinguish malicious processes from non-malicious processes.

Generally, machine learning classifiers are configured to examine data items and determine to which of N groups (classes) each data item belongs. Classification procedures can produce a vector of probabilities, e.g., the likelihoods of the data item belonging to each class. In the case of malicious process detection, two classes may be defined: malicious process (e.g., malware) and non-malicious process (e.g., non-malware). As a result, the output from classifiers may include probabilities representing the likelihood of a data item being malicious. In situations where a particular classifier is not adapted to process/classify time-series data (like the time-series micro-architectural data collected by the AV engine 210) this difficulty can be overcome by arranging input data (e.g., corresponding to micro-architectural events occurring at a particular location of the hardware, such as at a particular counter) that occurred at different time instances into a single vector of features that is presented as input to the classifier. Under this approach, time-based data may be consolidated into a vector of data, where each vector point corresponds to a micro-architectural sample for a certain counter or location that occurred at a different time instance. Additionally and/or alternatively, another approach for processing time-dependent data (micro-architectural data) using classifiers that are generally not configured to handle sequences of time-dependent data is to separately process with such a classifier data points taken for a particular process at different time instances, and aggregate the classifier's results in order to classify the entire process. In some embodiments, different aggregation operations may be applied to a classifier's results, and the aggregation operation that is determined (e.g., through testing and experimentation) to yield the best classification results may be used to perform future aggregation operations. For example, one aggregation operation that may be used is a simple average operation. Another aggregation operation that may be used is a weighted average operation in which, for example, data points which are equally probable to belong to each of the various available classes are given zero weight, whereas data points with high probabilities are given relatively large weights.

The types of classifiers that may be used to process/analyze the collected micro-architectural data points corresponding to the executing processes belong to two main classifier categories: linear classifiers, and non-linear classifiers. Linear classification procedures are configured to attempt to separate n-dimensional data points by a hyperplane—points on one side of the plane are points of class X and points on the other side are of class Y. Non-linear classifiers generally do not rely on this type of linear separation. Thus, any operation to derive a classification may be applied.

In some of the implementations described herein, non-linear classifiers were used to perform the data processing/analysis operations to reflect the fact that the data (e.g., micro-architectural data) that was used to determine whether at least one executing process may be malicious, or to identify a malicious process, may not necessarily be linearly-separable. Some examples of classifiers, configured to determine if a particular process (for which micro-architectural time-based data was collected) is malicious or non-malicious, that may be used with implementations of the AV engine 210 include:

K-Nearest Neighbors (KNN)—A KNN classifier is trained by inserting the training data points along with their labels into a spatial data structure, like a k-dimensional tree (referred to as a "k-d-tree") used for organizing points/data in a k-dimensional space. In order to classify a data point, that point's k nearest neighbors (in Euclidean space) are found using the spatial data structure. The probability that the data point is of a particular class is determined by how many of the data point's neighbors are of that class and how far they are from each other.

Decision Tree—Another way to classify data points it to use a non-spatial tree called a decision tree. This tree is built by recursively splitting training data into groups on a particular dimension. The dimension and split points are chosen to minimize the entropy with each group. These decisions can also integrate some randomness, decreasing the quality of the tree but helping to prevent overtraining. After some minimum entropy is met, or a maximum depth hit, a branch terminates, storing in it the mix of labels in its group, e.g., 30% malware vs. 70% non-malware. To classify a new data point, the decision tree traverses the tree to find the new point's group (leaf node), and returns the stored mix.

Random Forest—One way to increase the accuracy of a classifier is to use a lot of different classifiers and combine the results. In a random forest, multiple decision trees are built using some randomness. When classifying a new data point, the results of all trees in the forest are weighted equally to produce a result.

Artificial Neural Network (ANN)—A neural network machine attempts to model biological brains by including neurons which are connected to each other with various weights. The weight values between connections can be varied, thus enabling the neural network to adapt (or learn) in response to training data it receives. In feed-forward neural nets, input values are supplied at one edge and propagate through a cycle-less network to the output nodes. In some embodiments, one input neuron for each dimension, and two output nodes (e.g., one indicating the probability that malware is running, one indicating the probability that non-malware is running) are defined.

Tensor Density—this classifier discretizes the input space into different buckets. Each bucket contains the mix of classes in the training data set. A data point is classified by finding its bin and returning the stored mix. Generally, a tensor density classifier uses O(1) lookup time, and is thus considered to be time-efficient.

Other classifiers that may be used also include, in some embodiments, a support vector machine configured to generate, for example, classification functions or general regression functions. In some embodiments, the classifiers may be implemented using regression techniques to derive best-fit curves, a classification procedure based on hidden Markov model, and/or other types of machine learning techniques. In embodiments in which a hidden Markov model-based classifier is used, patterns in the data (e.g., micro-architectural data) being processed may be identified using self-similarity analysis, and the transitions in patterns may be used to build the hidden Markov model with which malware/goodware can be predicted/classified. Additionally, linear classification techniques like kernel methods which are capable of accurately classifying data but with reduced computational requirements may also be used.

To train the classifiers to identify suspected malicious processes based on micro-architectural data collected from a hardware-based device that is to be monitored, in some implementations, a remote system whose hardware configuration may be the same or similar to the hardware configuration of the hardware device with respect to which the procedures described herein are performed, may execute variants of a known malicious process (e.g., a malware discovered and/or tracked by some third party). Micro-architectural data resulting from execution of the variants of the particular malware (e.g., represented in a form that may be similar to the data used to generate graphs similar to those illustrated in FIG. 1) is collected. Periodically, data representative of the micro-architectural data captured by the remote system may be communicated to the AV engine 210, and stored on the database 214. The remote system may also provide micro-architectural data corresponding to known non-malicious processes. The example micro-architectural data communicated by the remote system may be used to train the classifier 216 by providing that micro-architectural data and the respective identities and/or type (e.g., malicious or non-malicious) of the processes that caused that micro-architectural data to be produced to at least some of the one or more of the classifiers 216a-n. The training data will cause the classifiers 216a-n to be configured (e.g., dynamically configured) so that upon presenting similar micro-architectural data (collected from the hardware device to be monitored) to the classifiers, output consistent with the processes types/identities of the training data will be produced.

As noted, an AV engine, such as the AV engine 210 of FIG. 2, may be realized entirely in hardware (e.g., implemented as a module on the hardware device that is to be monitored), entirely in software (e.g., as a multi-module application executing on a computing system that includes the hardware to be monitored), or as a hardware-software combination implementation in which one component (e.g., the sampling unit 212 of FIG. 2) is implemented in hardware, while the database and classifier units 214 and 216 are implemented via software). If implemented at least partly by software, the software components may be configured to communicate with the hardware component (e.g., using an interfacing procedure) to receive data (e.g., micro-architectural data obtained by the sampling unit) and/or to transmit data or control signals to the hardware-based component.

In addition to being configured to collect and store micro-architectural data and analyze collected micro-architectural data to determine whether or not malicious behavior is occurring (and possibly more particularly identify the malicious process(es)), the AV engine 210 is also configured to take certain actions if a threat is detected (e.g., shut down the hardware or report the malicious behavior), and update the AV engine with malicious processes definitions and micro-architectural signatures. More particularly, there are a wide variety of security policies that can be implemented by an AV engine such as the AV engine 210. Some viable security policies include:

Using the AV engine as a first-stage malware predictor—When the AV engine suspects a program to be malicious it can run more sophisticated behavioral analysis on the program. Hardware analysis happens 'at speed' and is significantly faster than behavioral analysis used by malicious process analysts to create signatures. Such pre-filtering can avoid costly behavioral processing for 'goodware.'

Migrating sensitive computation—In multi-tenant settings such as public clouds, when the AV engine suspects that an active thread on the system is being attacked (e.g., through a side-channel) the AV engine can move the sensitive computation. In some scenarios it may be acceptable for the AV system to simply kill a suspect process.

Using the AV engine for forensics—Logging data for forensics is expensive as it often involves logging all interactions between the suspect process and the environment. To mitigate these overheads, the information necessary for forensics can be logged only when the AV engine suspects that a process is malicious.

Screening for goodware—In some embodiments, the hardware-based micro-architectural data collected can be used to identity non-malicious processes, and to corroborate that those processes are in fact non-malicious. For example, in some implementations, underlying code samples of processes identified by the AV engine as non-malicious can be analyzed by, for example, comparing the code sample to known code samples (that were previously obtained) corresponding to the processes analyzed. If the examined underlying code of the executing processes matches the known code listing previously obtained, the executing process is confirmed as being non-malicious.

Thus, there is a broad spectrum of actions that can be taken based on the AV engine's output. The systems and procedures described herein to implement an AV engine should be flexible enough to implement the above-described security policies. Conceptually, this means that, in some embodiments, the AV engine should be able to interrupt computation on any given core and run the policy payload on that machine. This requires the AV engine to be able to issue a non-maskable inter-processor interrupt. Optionally, in some embodiments, the AV engine can communicate to the OS or supervisory software that it has detected a suspect process so that the system can start migrating other co-resident sensitive computation. In some embodiments, the AV engine may also be configured to run in the highest privilege mode.

Additionally, as noted, in some embodiments, the AV engine 210 may be configured to be updated with new malware signatures as they become available, or when new classification techniques are implemented. The AV update should be implemented in a way to prevent attackers from compromising the AV. For instance, a rogue user should not be able to mute the AV engine or subvert the AV engine to create a persistent, high-privilege rootkit.

Figure 8A:
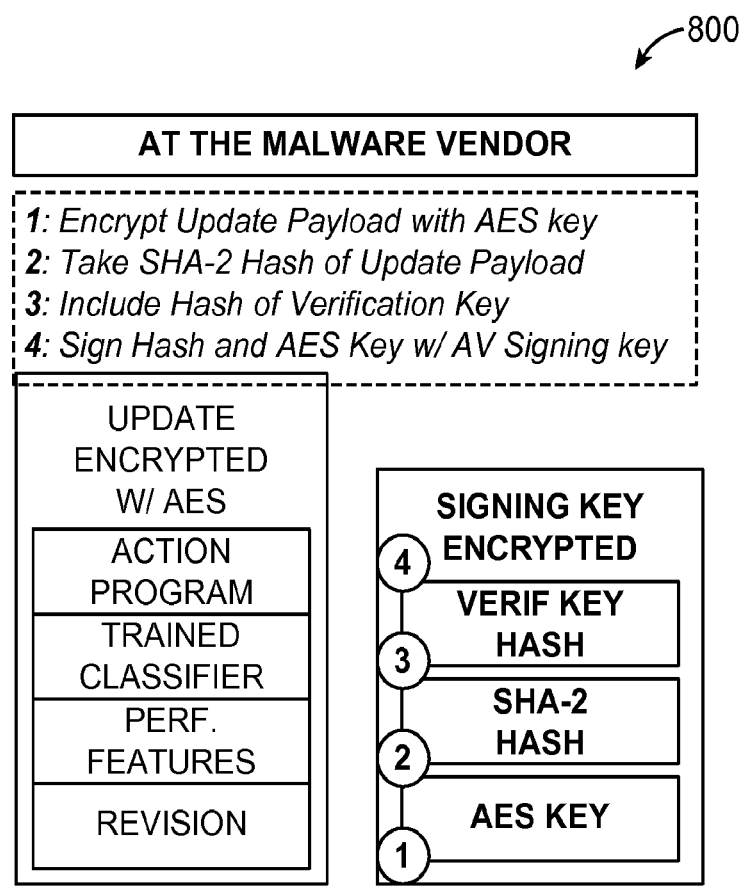
FIG. 8A is a schematic diagram of an example security update payload.
Figure 8B:
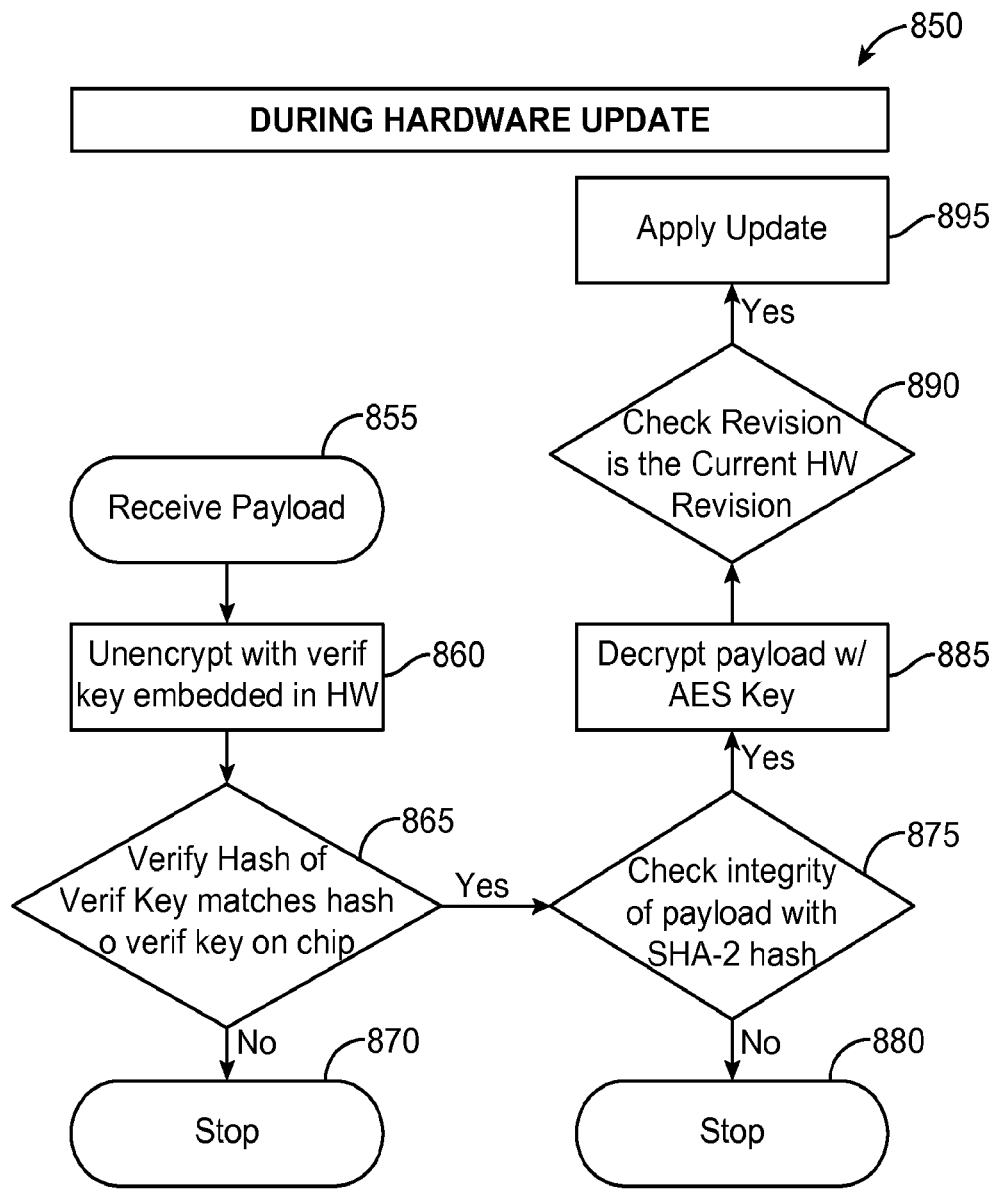
FIG. 8B is a flowchart of an example procedure to receive a security update payload and update the configuration of an AV engine.

Generally, security updates may include one or more of, for example, a classifier, an action program that specifies security policies, a configuration file that determines which performance features are to be used with what classifiers, micro-architectural data for malicious and/or non-malicious processes, and/or an update revision number. This data can be delivered to the AV engine securely using techniques/procedures adapted for a hardware setting. A schematic diagram of an example security update payload 800 that is to be sent from a system security vendor, including the various encryption levels applied to the payload, is depicted in FIG. 8A. An example procedure 850, generally performed by an AV engine, to receive a security update payload (such as the encrypted payload 800) and update the configuration of the AV engine, is depicted FIG. 8B. As shown in the figure, the procedure 850 includes receiving 855 the payload, and decrypting 860 the payload with a "verif" key embedded in the hardware (on which the AV engine is implemented). A determination is then made 865 of whether a resulting hash of the "verif" matches the expected hash of the verif key embedded in the hardware. If it doesn't, the procedure 850 terminates 870. If there is a match of the hash of the "verif" key, a determination is made 875 of the integrity of the payload with a SHA-2 hash function. If the integrity is confirmed, the payload is decrypted 885 with an AES key (otherwise, the procedure terminates 880), and upon a determination that the update revision number indicated in the payload is in agreement with a revision number indicator maintained in the hardware device (at 890), the updates in the payload are applied 895.

As indicated in relation to the operation 890 of the procedure 850, in some embodiments, the hardware device on which the AV engine is, at least partly, implemented, maintains the revision number of the last update, and that revision number is incremented on every update. This is to prevent/inhibit an attacker from rolling back the AV system, which an attacker might do to prevent the system from discovering new malicious processes. The AV engine may offer this protection by rejecting updates with a revision number that is older than the revision number maintained in the hardware counter.

Figure 3:
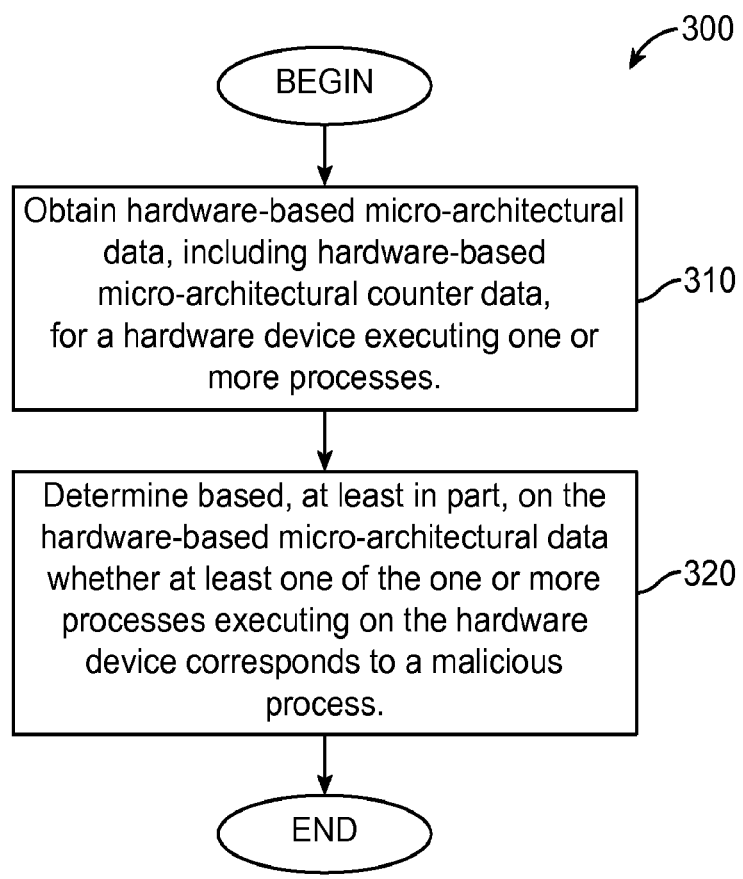
FIG. 3 is a flow chart of an example procedure to detect malicious processes.

With reference now to FIG. 3, a flowchart of an example procedure 300 to detect malicious processes is shown. The procedure 300 includes obtaining 310 hardware-based micro-architectural data, including hardware-based micro-architectural counter data, for a hardware device executing one or more processes. As noted, in some embodiments, obtaining the micro-architectural data may be performed by a sampling unit, which may be implemented, at least partly, in hardware as part of the hardware-device that is to be monitored (i.e., the hardware device executing the one or more processes with respect to which the micro-architectural data is to be collected). In some embodiments, the micro-architectural data may be obtained periodically at regular or irregular intervals (e.g., at intervals of length determined by a pseudo random process), and may be obtained through a data-pull (e.g., by the sampling unit initiating the collection of the micro-architectural data, with or without interruption the hardware device being observed) or through a data push process (e.g., the hardware device initiating periodic communication of micro-architectural data to an AV engine).

Based, at least in part, on the obtained hardware-based micro-architectural data, a determination is made 320 whether at least one of the one or more processes executing on the hardware device corresponds to a malicious process. In some embodiments, a more specific determination may be made of the type or identity of the at least one of the one or more processes executing on the hardware device. As noted, determination of whether at least one process is malicious and/or the type and/or identity of the at least one of the one or more processes executing on the hardware device may be performed using a machine learning system that may include one or more classifiers (such as the one or more classifiers 216*a-n*) that were trained with training data including micro-architectural data for variants of known malicious and non-malicious processes.

Thus, when a variant of a known malicious process executes on the hardware device to be monitored, even in situations where the exact implementation of the malicious process has been modified, the malicious process will generally perform operations that are characteristic of that process (e.g., accessing particular modules, retrieving specific types of data, etc.). These operations that are characteristic of the known malicious process will result in a micro-architectural data signature (that may be represented as a time series), which may then be identified (or at least identified as being malicious or non-malicious) through at least one of the one or more classifiers of the machine learning system of the AV engine.

Figure 4:
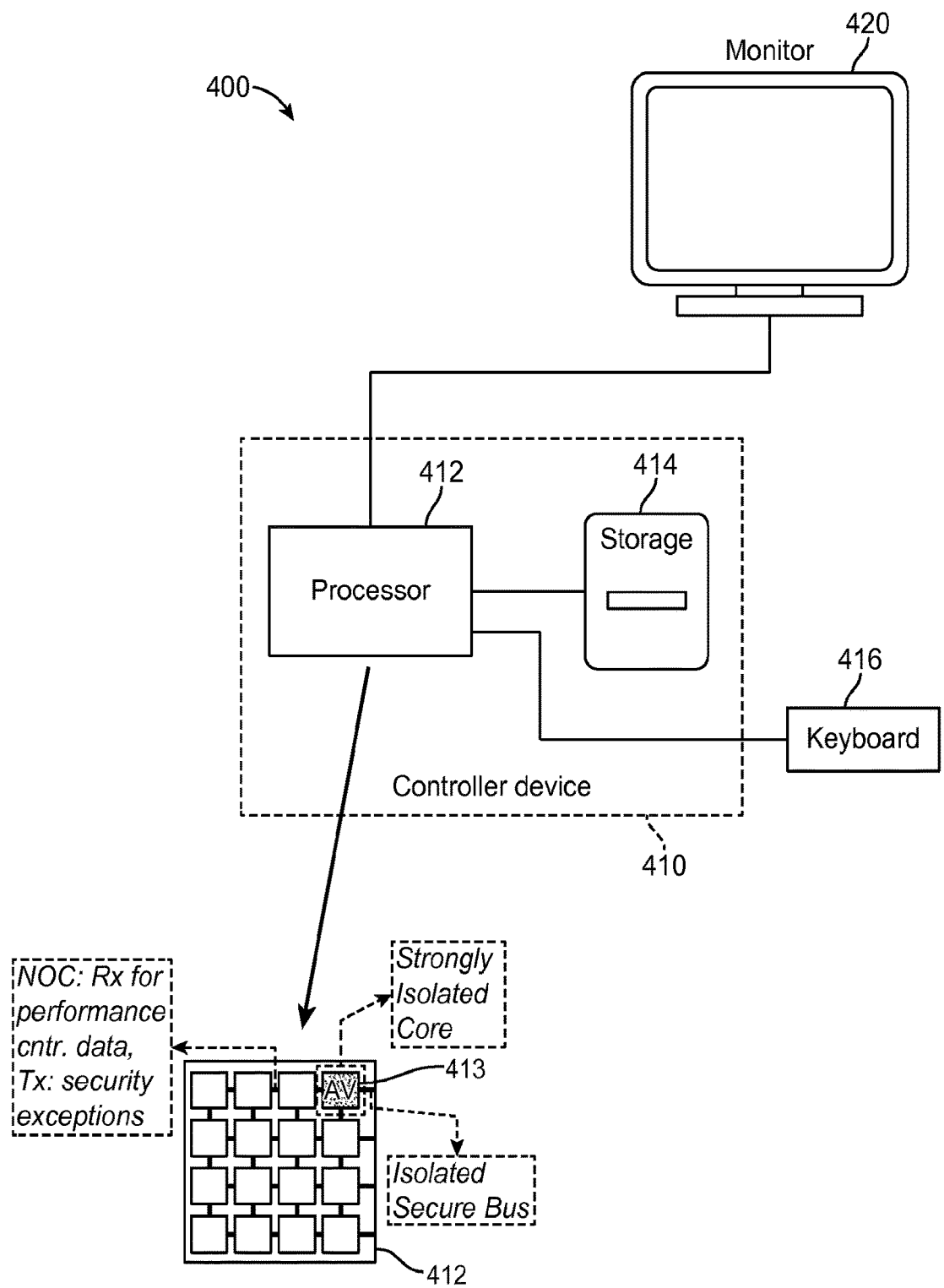
FIG. 4 is a schematic diagram of an example system in which an AV engine is implemented.

With reference to FIG. 4, an example system 400 in which an AV engine (such as the AV engine 210 of FIG. 2) is implemented, is shown. The system 400 includes a hardware device such as controller device 410, which may be a processor-based personal computer, a specialized computing device, and so forth, and which includes, in some implementations, a processor-based unit such as central processor unit (CPU) 412. In some embodiments, the controller device 410 may be realized, at least in part, using modules such as an FPGA (field programmable gate array), an ASIC (application-specific integrated circuit), a DSP processor, etc.

As noted, in some embodiments, at least part of the AV engine may be implemented in hardware directly on the hardware device that is to be monitored, and/or may be implemented in software executing on a dedicated and secure controller device. For example, as depicted in FIG. 4, the CPU 412 may be a multi-core processor, and the hardware portion of the AV engine may thus be realized on one or more of the cores 413 of the CPU 412, and be configured (e.g., through pre- or post-manufacturing programming) to perform one or more of the functions of the AV engine (e.g., collect micro-architectural data). If the hardware device to be monitored is an application-specific controller device (e.g., implemented as an application-specific integrated circuit), the hardware-portion of the AV may be realized at the time of manufacturing of the controller, e.g., as a special-purpose malware detection units that sit on a network-on-chip, on-chip/off-chip FPGA, or off-chip ASIC co-processor. These choices represent different trade-offs in terms of flexibility and area- and energy-efficiency. Moving security protection to the hardware level solves several problems and provides some interesting opportunities. For example, it ensures that the security system cannot be disabled by software, even if the kernel is compromised. Second, because the security system runs beneath the operating system, the security system might be able to protect against kernel exploits and other attacks against the kernel. Third, because the hardware itself is being modified (to accommodate at least some portions of the AV engine), arbitrary static and dynamic monitoring capabilities can be added. This gives the security system extensive viewing capabilities into software behavior.

As further shown in FIG. 4, in addition to the CPU 412 and/or other application-specific hardware to implement controller functionality, the system 400 includes main memory, cache memory and bus interface circuits (not shown in FIG. 4). For example, the controller device 410 may include a mass storage element 414, such as a hard drive or flash drive associated with the system. The computing system 400 may further include a keyboard, or keypad, or some other user input interface 416, and a monitor 420, e.g., a CRT (cathode ray tube), LCD (liquid crystal display) monitor, etc., that may be placed where a user can access them.

The controller device 410 is configured to facilitate, for example, the implementation of operations to obtain hardware-based micro-architectural data resulting from execution of one or more processes on the CPU 412 and/or on some other application-specific device on which processes are executing (or can be executed) and determine, based on the micro-architectural data obtained, whether at least one of one or more of the processes executing on the controller device 410 of the system 400 is a potentially malicious process (e.g., malware). In some embodiments, identities of the one or more processes executing on the hardware of the controller device 410 may be determined based on the micro-architectural data collected. The storage device 414 may thus include a computer program product that when executed on, for example, a processor-based implementation of the controller device 410 causes the device to perform operations to facilitate the implementation of procedures described, including the procedures to obtain micro-architectural data and determine based on that data whether at least one of the one or more executing processes is potentially malicious.

The controller device 410 may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. As noted, alternatively and/or additionally, in some embodiments, special purpose logic circuitry, e.g., an FPGA (field programmable gate array), an ASIC (application-specific integrated circuit), a DSP processor, etc., may be used in the implementation of the system 400. Other modules that may be included with the controller device 410 are speakers, a sound card, a pointing device, e.g., a mouse or a trackball, by which the user can provide input to the system 400. The controller device 410 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. Non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

To evaluate the efficacy of the systems and procedures described herein to detect/identify the existence of different types of malicious processes, testing for different hardware device (e.g., different processor architecture) and for different malicious processes (malware, side channel attack processes, etc.) was conducted.

The evaluations and testing performed included testing to determine the efficacy of the systems and procedures described herein to detect Android malware. Examples of Android malware include malware to create advertisements and install unwanted links, cluttering up the user's device, etc. More advanced malware may take advantage of a phone's features, e.g., making phone calls or sending text messages to premium services, resulting in charges on the user's cell phone bill. Other type of Android malware may compromise a user's privacy in various ways, including accessing information like phone numbers, contact information, IMEI numbers and other sensitive data. Moreover, many Android-based mobile devices have GPS capability, and therefore malware may be capable of physically tracking victims.

The systems and procedures described herein were applied to Android malware obtained from various sources that catalog or study malwares. The malware data sets acquired were divided into families of variants. In families with only one variant, different execution cycles were used to acquire micro-architecture data for the malware specimen. For families with more than one variant, some of the variants were used for training purposes (e.g., generally about a ⅓ of the variants were used for training), while the remaining variants were used for testing (e.g., to determine if the system and procedures described herein would detect those variants). FIG. 5 is a table 500 of some of the Android malware families that were tested. Column 502 in the table 500, identified as APKs, indicates the number of variants that were available for the respective malware families.

To train the classifiers that were used to process micro-architectural data, micro-architectural performance data was collected on all malware samples. In the evaluations and testing performed, the collection infrastructure operated at the thread level. In addition to data on malware, data for 86 non-malware applications was also collected, resulting in data on 92,475 non-malware threads. These data sets were used for both training and testing, with generally a ⅓ of the data sets used for training, and the rest of the data sets used for testing. The performance of the various classifiers that may be used to process the micro-architectural data can be adjusted using their respective configuration parameters. For instance, for a k-Nearest Neighbors (KNN) classifier, k is an adjustable configuration parameter. To identify an optimal set of parameters, the classifier (or, in some situations, several classifiers) that is chosen is the one that identifies the most malware correctly. However, the amount of malware identified varies with false positive rate. As a classifier is configured to make it more sensitive, more malware is identified, but non-malicious, legitimate processes are then also identified as malware. To determine which classifier (or classifiers) to use, in some embodiments, the classifier(s) that performs best (on the training data) for a given false positive percentage may be selected.

Figure 6:
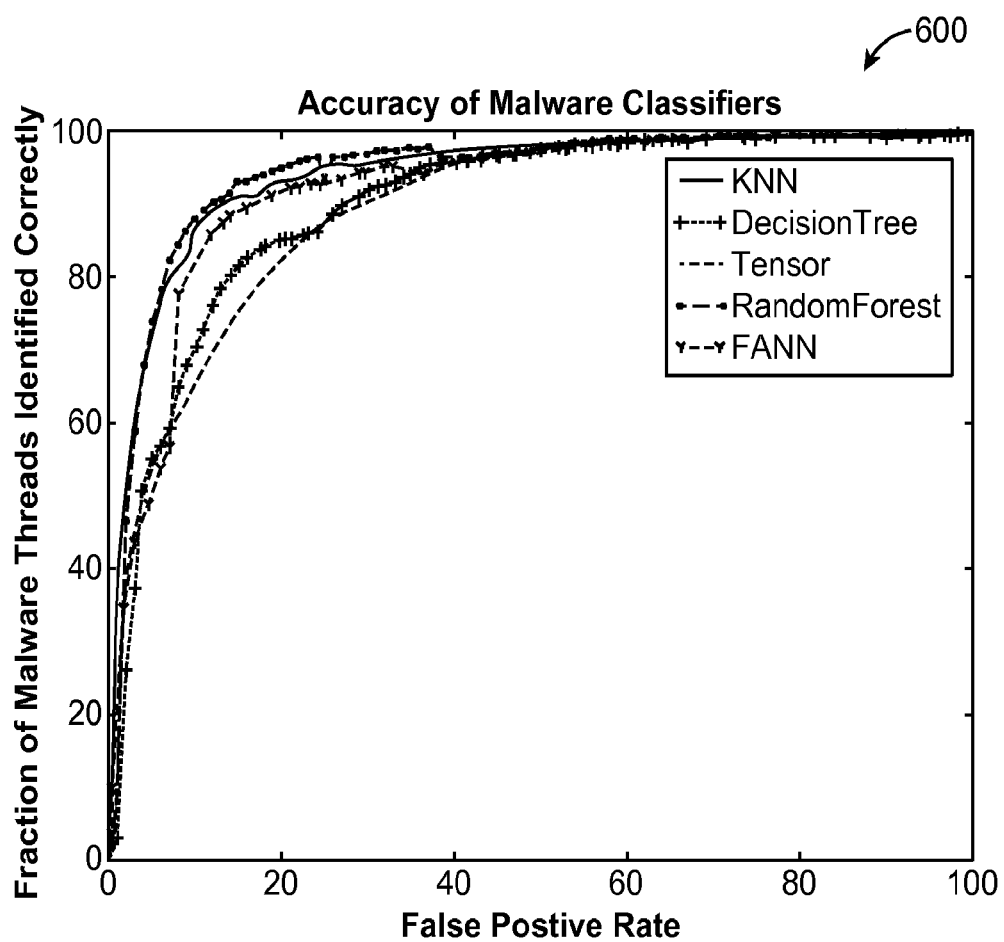
FIG. 6 is a graph illustrating accuracy of various binary classifiers when applied to micro-architectural data produced, in part, by Android malware.

FIG. 6 contains a graph 600 showing the accuracy of various binary classifiers in detecting Android malware. As illustrated in the graph 600, as the false positives rate is increased, the classifiers find more malware (column 504 of table 500 in FIG. 5 provides the rate for correctly identifying the executed processes for the various malware families on which the classifiers, such the decision tree classifier, were applied for a false positive rate of 10% or better). The results obtained for the Android malware testing indicate that the classifiers tested work properly and that micro-architectural data (including micro-architectural performance counter data) can, with simple analysis, be used to detect Android malware with relatively good accuracy. For example, the "AnserverBot" malware had 187 known variants (which, as noted, were obtained from third parties that study and categorize malicious processes such as Android malware). Of those 187 known variants, 61 variants were used to train the classifiers of the systems and procedures described herein. After being trained with those 61 variants, the classifiers tested were able to identify 96.6% of the threads of the remaining 126 variants.

Evaluations and testing to determine the efficacy of the systems and procedures described herein was also performed on known Linux rootkits. Rootkits are malicious software that attackers install on compromised systems to evade detection and maximize their period of access on the systems. Once installed, rootkits hide their presence in the systems, typically by modifying portions of the operating systems to obscure specific processes, network ports, files, directories and session log-on traces. With their stealth capabilities, they can pose a significant threat to systems security due to the difficulty in detecting such infections.

In evaluating and testing the efficacy of the systems and procedures to detect Linux rootkit processes, two publicly available Linux rootkits were used that, once loaded, gave an attacker the ability to hide log-on session traces, network ports, processes, files and directories. The two rootkits used were:

1. Average Coder Rootkit—This rootkit works as a loadable kernel module that hide traces via hooking the kernel file system function calls. It is loaded into the kernel via the Linux command insmod. It allows the attacker to modify the system information to hide at runtime by writing via the echo command to a predefined file/proc/buddyinfo.
2. Jynx2 Rootkit—This rootkit functions as a shared library and is installed by configuring the LDPRELOAD environment variable to reference this rootkit. When this is done, the rootkit is executed as a shared library whenever any program runs. The information it hides is pre-configured at compile-time and cannot be modified once it is loaded.

The Linux operating system has native utility programs that produce listings of the system current state (such as current process listing and network ports). To evade detection, the rootkits are designed to obscure portions of the output of these programs. Therefore, it is likely that micro-architecture performance counter data for these programs (produced on the processor device on which the rootkit processes are executing) will show some degree of deviation after a rootkit infection. To examine the presence of such deviation, collection of per-process performance counter data focused on the following processes

| Program | Relevant function |
|---------|-------------------|
| ps | List active running processes |
| ls | List files and directories |
| who | List active log-on sessions |
| netstat | List active network connections |

Micro-architectural performance counter data was collected for various arbitrarily selected event types (such as number of branch misprediction, number of data TLB misses, number of L1 instruction cache reads) for multiple execution runs of all the programs. Two sets of data were collected—one set was collected before the rootkits were installed (that collected set was referred to as the "clean set"), and the second set was collected after the system was infected with the rootkits (that set was referred to as the "dirty set"). To introduce variation to the execution flows of the programs, each run of the programs was executed with a random combination of their associated parameters. To do this, a list of command-lines comprising the program names combined with a random set of valid parameters was generated. Each command-line was then randomly tagged as either clean or dirty to indicate the set of data it would be used in. An example subset list of the command-lines is provided below:

```
(clean) netstat -n
(clean) netstat -nt
(dirty) netstat -ntu
...
(dirty) ls -l /usr/include
(clean) ls -ld /home
(dirty) ls -lar /home/user
(clean) ls -lart ../
...
```

With the random list of command-lines generated, per-process per-run performance data was collected. Additionally, to reduce input bias and to make the collected data more realistic, the action of various users logging into the server and doing a series of tasks (like creating new files and running new processes) was simulated. Because both the rootkits that were used have different stealth capabilities and target the outputs of different programs, dirty data was collected separately for each rootkit. The collection of the data for each rootkit was performed with the following programs it was designed against:

| Program | Average Coder | Jynx2 |
|---------|---------------|-------|
| ps | ✓ | |
| ls | | ✓ |
| who | ✓ | |
| netstat | ✓ | |

Figure 7:
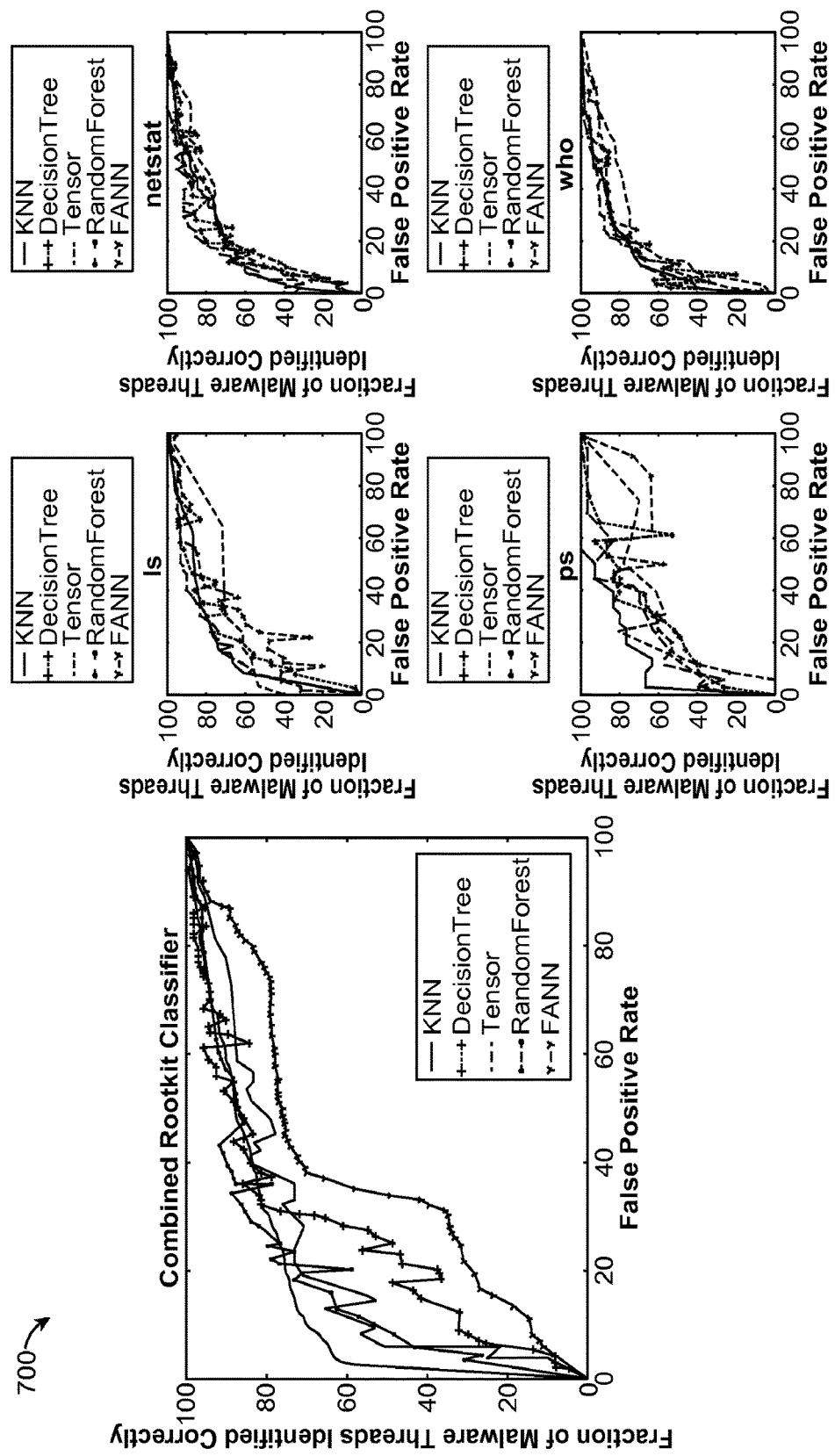
FIG. 7 includes graphs showing the accuracy of classifiers when applied to rootkits processes.

While the dirty data was being collected, the information hidden by the rootkits was also varied. This included adding to, and removing from, the list of network ports, files, processes and log-on session logs that were hidden by the rootkits. As with the testing performed with respect to the Android malware, the micro-architectural data collected about the rootkits was divided into testing and training sets, with ⅓ of the data being used for training a large number of classifiers, and the remaining data used for testing the trained classifiers. The classifiers were trained to determine if the processes/programs for which micro-architectural data was being collected were running with or without rootkits (i.e., whether or not there was a rootkit contamination). FIG. 7 includes graphs 700 showing the accuracy (in terms of the number of correctly identified malicious threads as a function of false-positive rate) of the classifiers used as part of AV engine implemented herein. Although the accuracy achieved by the systems and procedures described herein for rootkit detection is generally lower than that achieved when the systems and procedures were applied to the Android malware, it is to be noted that because rootkits do not operate as separate programs, but rather are configured to dynamically intercept programs' normal control flow, the training data used is affected by the rootkits to a relatively small degree. As a result, identification of rootkits is generally more difficult than identification of other types of malicious processes.

Evaluation and testing of the systems and procedures described herein was also performed in relation to side-channel attacks. The term side-channel refers to unintended information leakage present in real implementations of systems. Because specific implementations cannot adhere to the idealized axioms of theoretical models, side-channels can be used to steal information from theoretically secure systems. For example, RSA cryptographic keys can be stolen by observing the performance of the branch predictor, or of the caches, for most existing implementations. Common side-channel mediums include acoustic or electrical signals, power draw, application-level timing channels, architectural or micro-architectural affects, or, in general, any shared resources. Although side-channel attacks are not generally considered malware, they render security of a hardware-based device vulnerable, and furthermore, have characteristic micro-architectural behavior that may be detected by the systems and procedures described herein.

A side-channel "attacker" process is a process that gets placed within the system in such a way that it shares a resource and uses that resource to learn information. Micro-architectural examples include sharing a network card, a core pipeline, memory bandwidth and caches. In embodiments involving side-channel attacks on a cache, shared on-chip caches can leak tremendous amounts of data that can be readily used to, for example, steal cryptographic keys and/or other types of private data. Intuitively, attacker programs that exploit micro-architectural side-channels should have clear signatures in terms of performance. For example, side-channel attack processes repeatedly thrash a particular shared resource so as to gauge all the activity of the victim process with respect to that shared resource. Micro-architectural events and performance counters are therefore likely to take on extreme values during such attacks, and thus indicate that the occurrence of attacker programs/processes (and possibly identify those attacker programs/processes).

To test the efficacy of the systems and procedures described herein to determine the occurrence of side-channel attacks (and/or identify the specific side-channel attack processes), an array of cache side-channel attacks was implemented. Variants of the standard prime-and-probe technique were implemented, in which an attacker program/process wrote to every line in the L1 data cache, and then scanned the cache repeatedly (using a pattern chosen at compile time) to read every line. Whenever a miss occurred, it meant there was a conflict miss caused by the victim process sharing the cache. The result data of a successful prime-and-probe attack includes data about the cache lines used by the victim process over time. The prime-and-probe variants were implemented and executed against an OpenSSL victim process. The cache side-channel attack processes were compared against a wide array of normal processes, which included programs of SPEC2006 int, SPEC2006 fp, PARSEC, web browsers, games, graphics editors and other common desktop applications, as well as generic system-level processes.

As with testing performed for the Android malware and Linux rootkits, ⅓ of the micro-architectural data collected was used to train the classifiers of the AV engine (namely, the KNN, DecisionTree, Tensor, RandomForest, and FANN classifiers). In this case, the training data included 3872 normal program threads and 12 attack threads. The trained classifiers were used to analyze the remaining two thirds of the collected data. The classifiers achieved perfect results when analyzing the 7744 normal threads and 24 attacks threads of this example testing, detecting all 24 attack threads without producing any false positives. The results also indicated that in processing side-channel attack micro-architectural data, it did not matter which particular classifier was used.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for detection of anomalous program execution using hardware-based micro-architectural data using performance counters internal to one or more processors and configured to count internal events of the one or more processors, the method comprising:
    obtaining hardware-based micro-architectural data, including hardware-based time-varying micro-architectural performance counter data, for a hardware device executing one or more processes, wherein the time-varying micro-architectural performance counter data measures instruction-level events that occur on one or more circuits of the hardware device, wherein the events are internal to the one or more processors executing said processes, the events are counted on performance counters of said one or more processors, and the performance counters are configured to count said events;
    applying one or more machine-learning procedures to the obtained hardware-based micro-architectural data of the hardware device to determine whether at least one of the one or more processes executing on the hardware device corresponds to an anomalous process, wherein applying one or more machine-learning procedures comprises classifying the obtained hardware-based time-varying micro-architectural performance counter data based on previously identified patterns of hardware-based micro-architectural data associated with one or more anomalous processes;
    determining that the at least one of the one or more processes corresponds to an anomalous process based on the applied one or more machine-learning procedures; and
    terminating the execution of the at least one of the one or more processes determined to correspond to an anomalous process.

2. The method of claim 1, wherein obtaining the hardware-based micro-architectural data comprises:
    obtaining the hardware-based micro-architectural data at various time instances.

3. The method of claim 2, wherein obtaining the hardware-based micro-architectural data at the various time instances comprises:
    performing one or more of a data push operation initiated by the hardware device to send the hardware-based micro-architectural data, or a data pull operation, initiated by an antivirus engine, to send the hardware-based micro-architectural data.

4. The method of claim 1, wherein obtaining the hardware-based micro-architectural data comprises:
    obtaining multi-core hardware-based micro-architectural data resulting from execution of the one or more processes on a processor device with multiple processor cores; and
    correlating the respective hardware-based micro-architectural data obtained from each of the multiple processor cores to the one or more processes.

5. The method of claim 1, wherein applying the one or more machine-learning procedures to the hardware-based micro-architectural data to determine whether the at least one of the one or more processes corresponds to the anomalous process comprises:
    matching the obtained hardware-based time-varying micro-architectural performance counter data to the previously identified patterns of hardware-based micro-architectural data associated with one or more anomalous processes.

6. The method of claim 5, further comprising:
    obtaining updates for one or more patterns of hardware-based micro-architectural data associated with the one or more anomalous processes.

7. The method of claim 6, wherein obtaining the updates comprises:
    downloading encrypted data for previously identified patterns of hardware-based micro-architectural data associated with the one or more anomalous processes to an antivirus engine in communication with the hardware device providing the hardware-based micro-architectural data;
    decrypting at the antivirus engine the downloaded encrypted data for the previously identified patterns of hardware-based micro-architectural data associated with the one or more anomalous processes; and
    updating a revision counter maintained by the antivirus engine indicating a revision number of a most recent update of the previously identified patterns of hardware-based micro-architectural data.

8. The method of claim 1, wherein the one or more machine learning procedures comprise one or more of: a k-nearest neighbor procedure, a decision tree procedure, a random forest procedure, an artificial neural network procedure, a tensor density procedure, a hidden Markov model procedure, or a Support Vector Machine (SVM).

9. The method of claim 1, wherein the at least one of the one or more processes that corresponds to the anomalous process comprises one or more of a non-malicious, or a malicious process, the malicious process including one or more of: a malware process, or a side-channel attack process.

10. The method of claim 1, wherein the hardware-based micro-architectural data comprise one or more of: processor load density data, branch prediction performance data, or data regarding instruction cache misses.

11. A system for detection of anomalous program execution using hardware-based micro-architectural data using performance counters of one or more processors and configured to count internal events of the one or more processors, the one or more processors including performance counters configurable to count events internal to said one or more processors, the system comprising:
   a hardware device executing one or more processes, including the one or more processors; and
   an antivirus engine in communication with the hardware device, the antivirus engine configured to:
      obtain hardware-based micro-architectural data, including hardware-based time-varying micro-architectural performance counter data, for the hardware device executing the one or more processes, wherein the time-varying micro-architectural performance counter data measures instruction-level events that occur on one or more circuits of the hardware device, wherein the events are internal to the one or more processors executing said processes, the events are counted on the performance counters of said one or more processors, and the performance counters are configured to count said events;
      apply one or more machine-learning procedures to the obtained hardware-based micro-architectural data of the hardware device to determine whether at least one of the one or more processes executing on the hardware device corresponds to an anomalous process, wherein applying one or more machine-learning procedures comprises classifying the obtained hardware-based time-varying micro-architectural performance counter data based on previously identified patterns of hardware-based micro-architectural data associated with one or more anomalous processes;
      determine that the at least one of the one or more processes corresponds to an anomalous process based on the applied one or more machine-learning procedures; and
      terminate the execution of the at least one of the one or more processes determined to correspond to an anomalous process.

12. The system of claim 11, wherein the antivirus engine configured to obtain the hardware-based micro-architectural data is configured to:
   obtain the hardware-based micro-architectural data at various time instances.

13. The system of claim 12, wherein the antivirus engine configured to obtain the hardware-based micro-architectural data at the various time instances is configured to:
   receive the hardware-based micro-architectural data in response to one or more of: a data push operation initiated by the hardware device, or a data pull operation initiated by the antivirus engine.

14. The system of claim 11, wherein the antivirus engine configured to apply the one or more machine-learning procedures to the hardware-based micro-architectural data to determine whether the at least one of the one or more processes corresponds to the anomalous process is configured to:
   match the obtained hardware-based micro-architectural data to one or more patterns of hardware-based micro-architectural data associated with one or more anomalous processes.

15. The system of claim 14, wherein the antivirus engine is further configured to:
   obtain updates for the one or more patterns of hardware-based micro-architectural data associated with the one or more anomalous processes.

16. A non-transitory computer readable media storing a set of instructions executable on at least one programmable device that, when executed, causes operations for detection of anomalous program execution using hardware-based micro-architectural data using performance counters internal to one or more processors and configured to count internal events of the one or more processors, the operations comprising:
   obtaining hardware-based micro-architectural data, including hardware-based time-varying micro-architectural performance counter data, for a hardware device executing one or more processes, wherein the time-varying micro-architectural performance counter data measures instruction-level events that occur on one or more circuits of the hardware device, wherein the events are internal to the one or more processors executing said processes, the events are counted on performance counters of said one or more processors, and the performance counters are configured to count said events;
   applying one or more machine-learning procedures to the obtained hardware-based micro-architectural data of the hardware device to determine whether at least one of the one or more processes executing on the hardware device corresponds to an anomalous process, wherein applying one or more machine-learning procedures comprises classifying the obtained hardware-based time-varying micro-architectural performance counter data based on previously identified patterns of hardware-based micro-architectural data associated with one or more anomalous processes;
   determining that the at least one of the one or more processes corresponds to an anomalous program based on the applied one or more machine-learning procedures; and
   terminating the execution of the at least one of the one or more processes determined to correspond to an anomalous program.

17. The computer readable media of claim 16, wherein applying the one or more machine-learning procedures to the hardware-based micro-architectural data to determine whether the at least one of the one or more processes corresponds to the anomalous process comprises:
   matching the obtained hardware-based time-varying micro-architectural performance counter data to the previously identified patterns of hardware-based micro-architectural data associated with one or more anomalous processes.

18. An apparatus for detection of anomalous program execution using hardware-based micro architectural data using performance counters internal to one or more hardware processors and configured to count internal events of the one or more hardware processors, the apparatus comprising:
   a sampling unit configured to obtain hardware-based micro architectural data, including hardware-based time-varying micro-architectural performance counter data, for a hardware device executing one or more processes, wherein the time-varying micro-architectural performance counter data measures instruction-level events that occur on one or more circuits of the hardware device, wherein the events are internal to the one or more processors executing said processes, the events are counted on performance counters of said one or more processors, and the performance counters are configured to count said events, the sampling unit being realized on the hardware device or implemented as a hardware realization; and a software-implemented classifier configured to apply one or more machine-learning procedures to the obtained hardware-based micro-architectural data of the hardware device to determine whether at least one of the one or more processes executing on the hardware device corresponds to an anomalous process, wherein applying one or more machine-learning procedures comprises classifying the obtained hardware-based time varying micro-architectural performance counter data based on previously identified patterns of hardware-based micro-architectural data associated with one or more anomalous processes;

wherein upon determining that the at least one of the one or more processes corresponds to an anomalous process based on the applied one or more machine learning procedures, the apparatus terminates the execution of the at least one of the one or more processes determined to correspond to an anomalous process.

19. The method of claim 5, wherein the previously identified patterns of hardware-based micro-architectural data correspond to different hardware-based micro-architectural behaviors.

20. The system of claim 14, wherein the previously identified patterns of hardware-based micro-architectural data correspond to different hardware-based micro-architectural behaviors.

21. The computer readable media of claim 17, wherein the previously identified patterns of hardware-based micro-architectural data correspond to different hardware-based micro-architectural behaviors.

* * * * *